Figure 1:
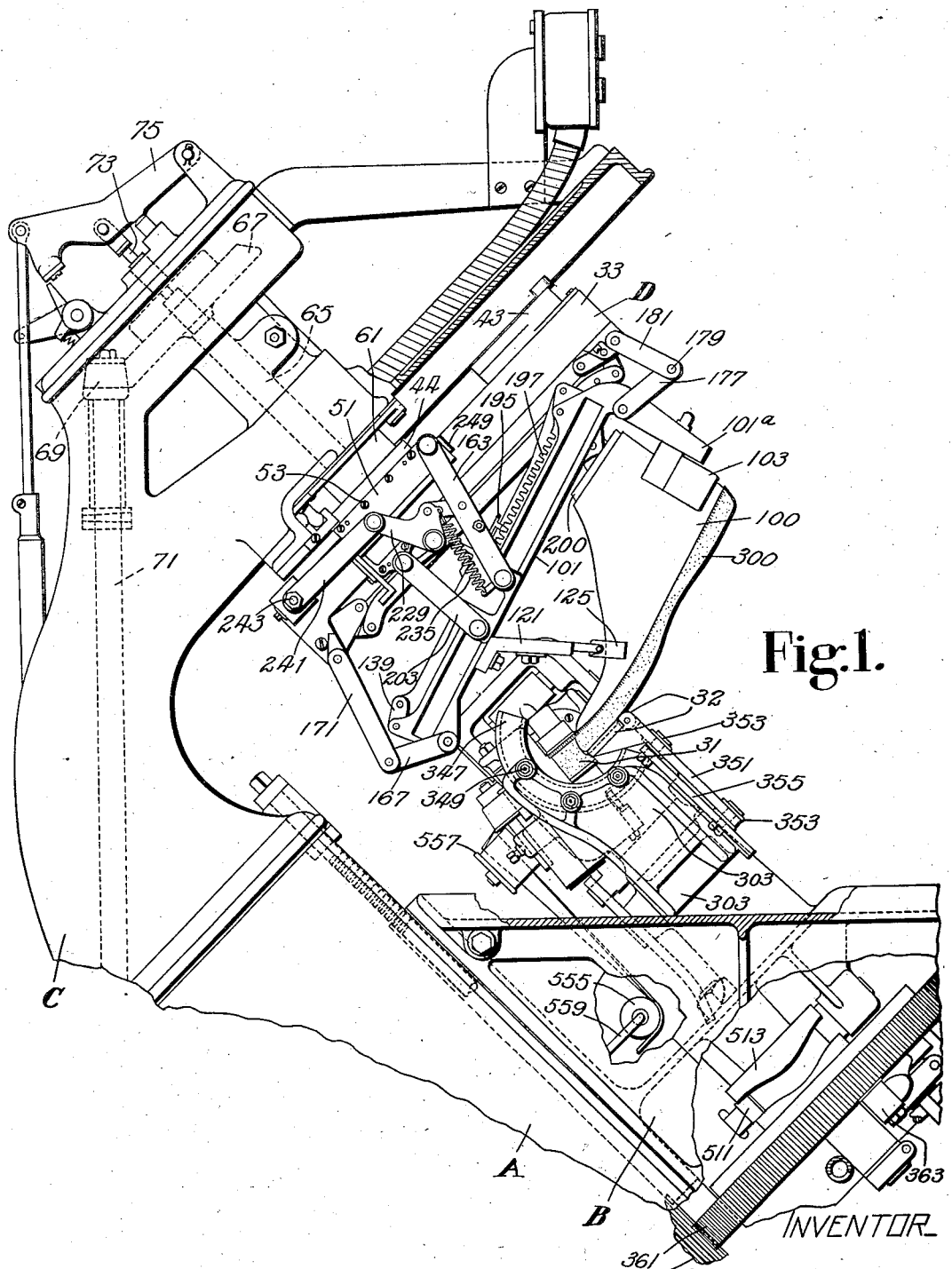

May 19, 1936.  E. W. STACEY  2,041,379
FOXING LAYING MACHINE
Filed Nov. 23, 1933  11 Sheets-Sheet 1

INVENTOR
Ernest W. Stacey
By his attorney
Victor Cobb

May 19, 1936.  E. W. STACEY  2,041,379
FOXING LAYING MACHINE
Filed Nov. 23, 1933  11 Sheets-Sheet 2
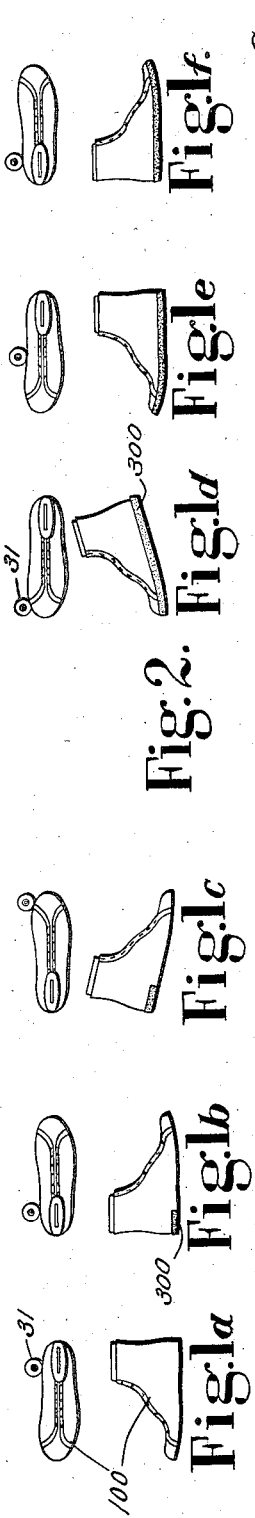
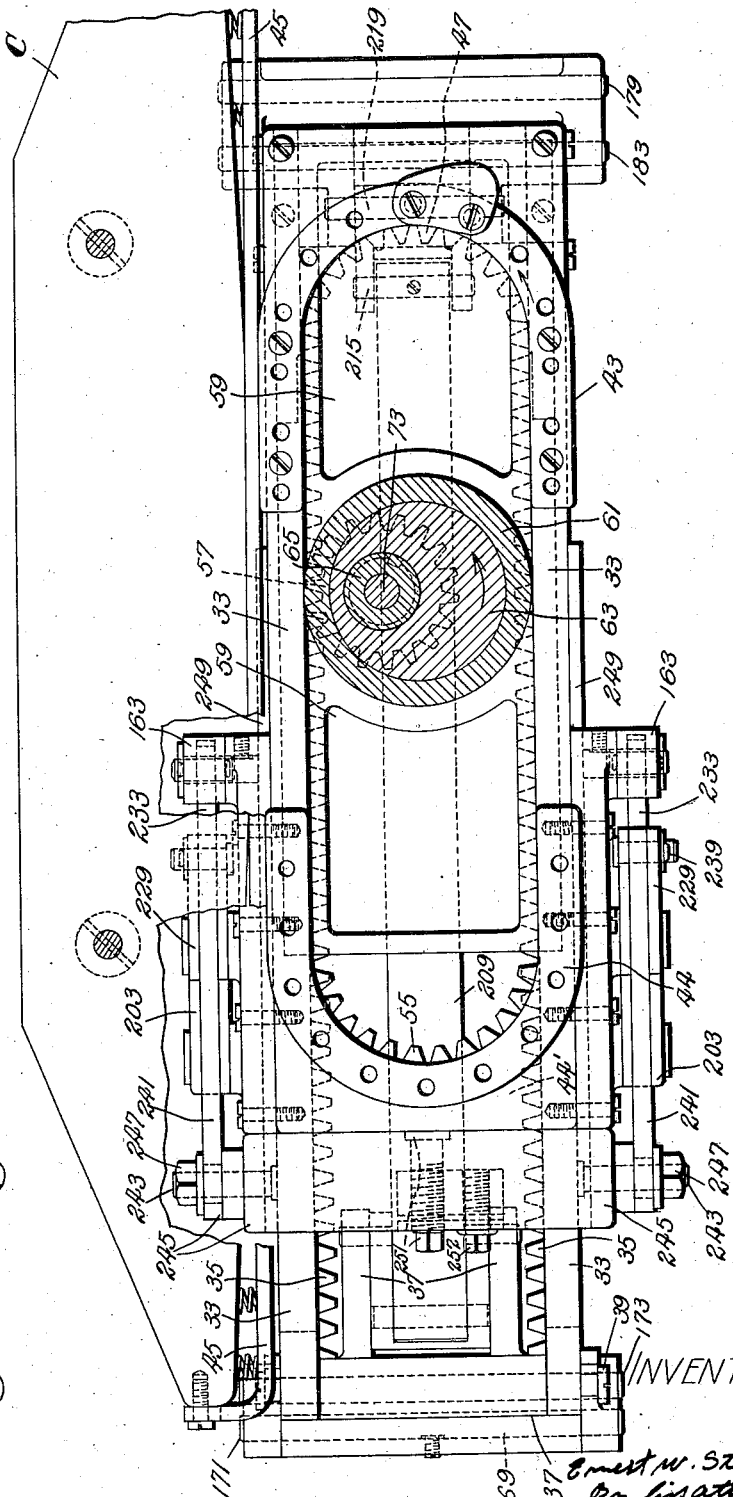

May 19, 1936.  E. W. STACEY  2,041,379
FOXING LAYING MACHINE
Filed Nov. 23, 1933  11 Sheets-Sheet 3

INVENTOR
Ernest W. Stacey
By his Attorney
Victor Cole

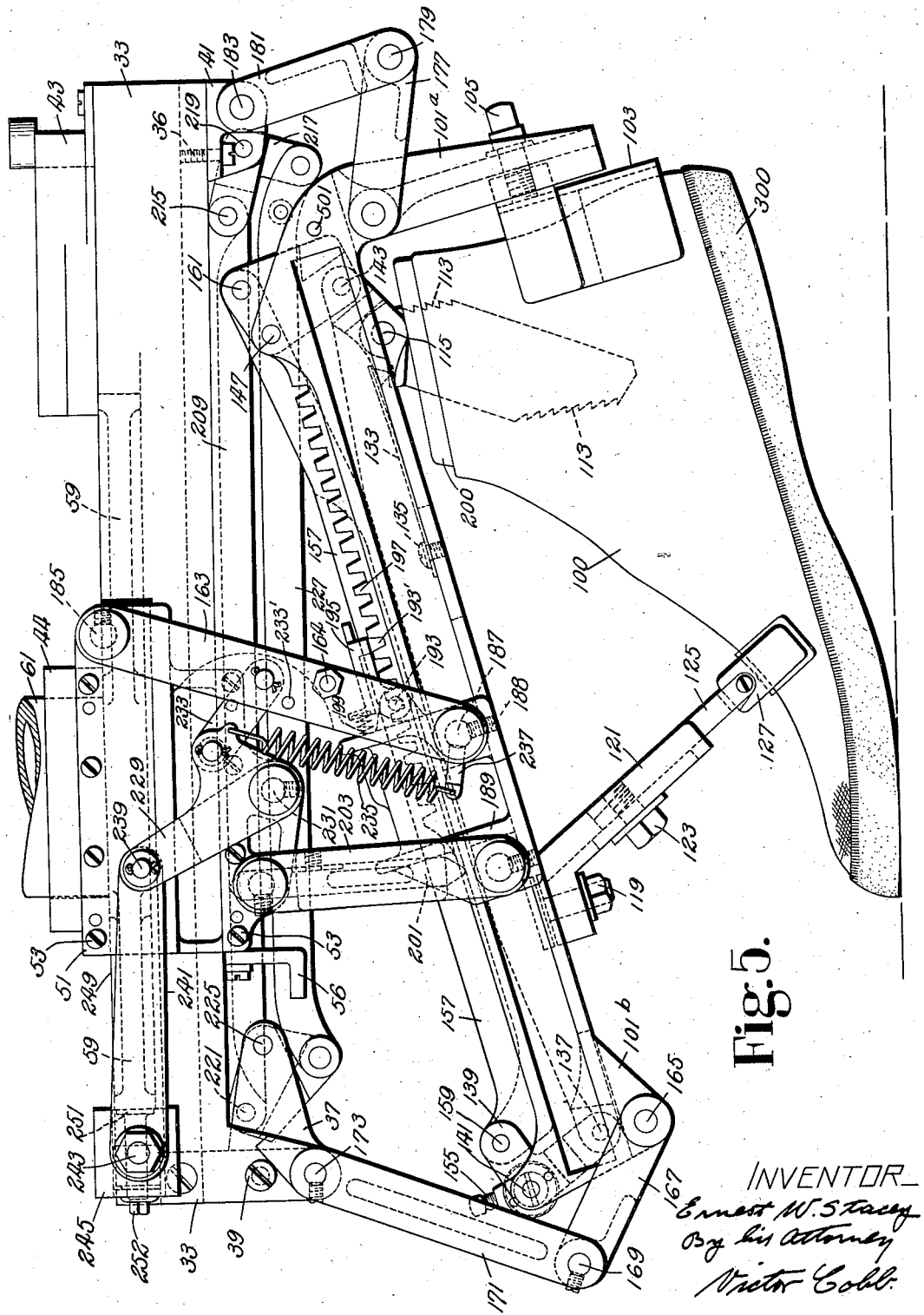

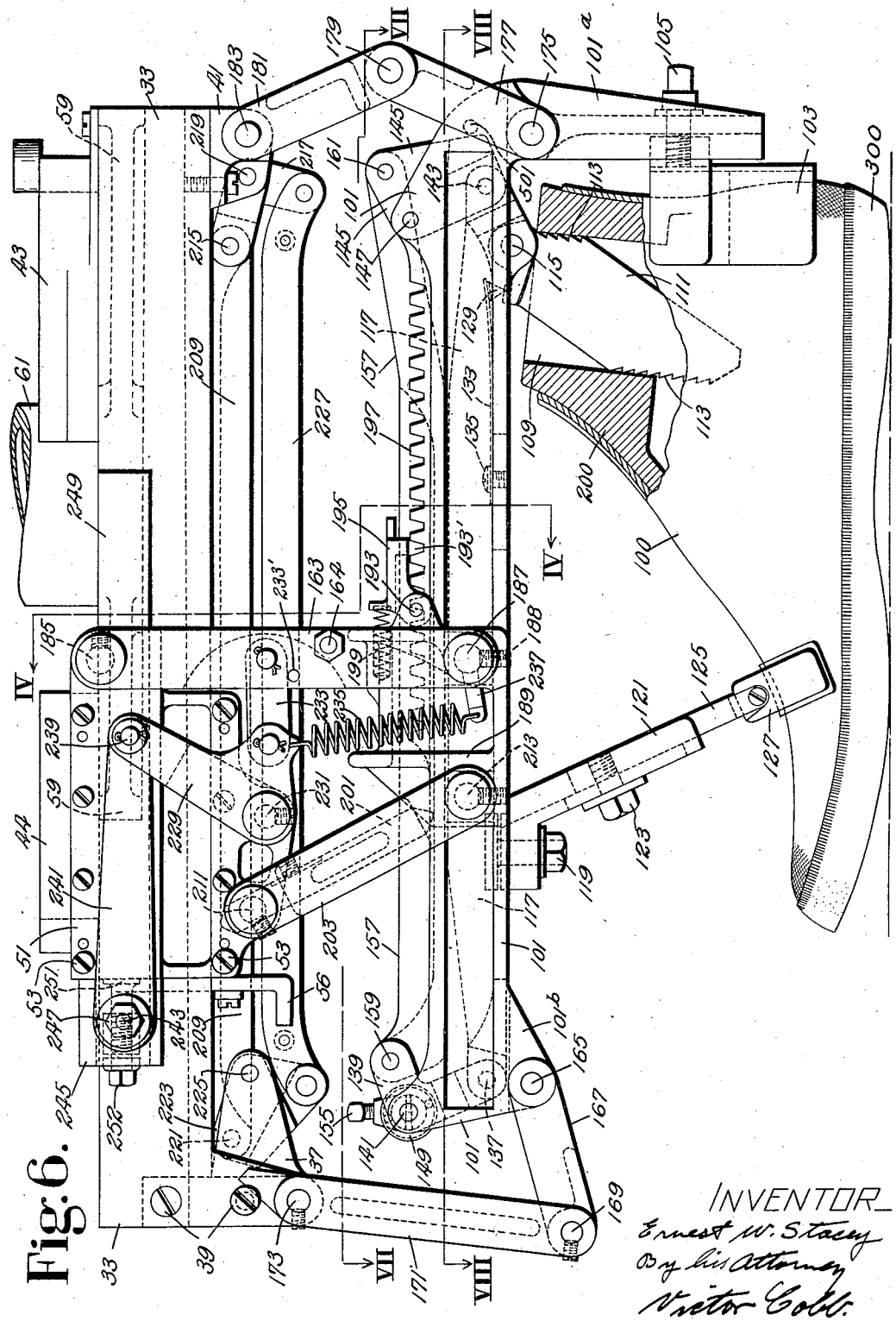

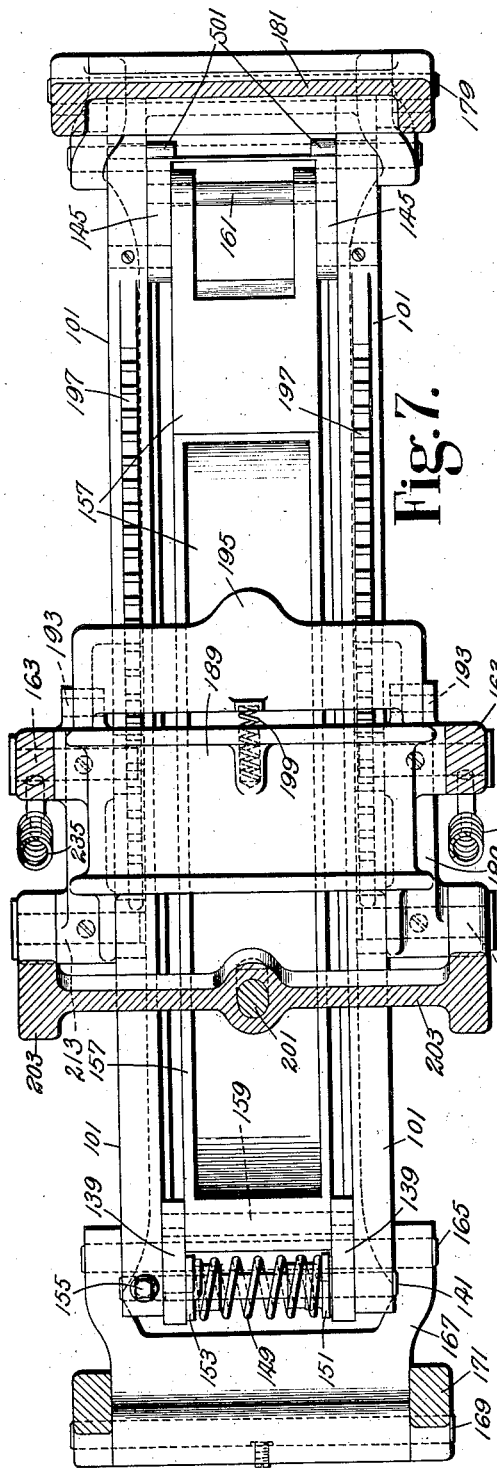

May 19, 1936.  E. W. STACEY  2,041,379
FOXING LAYING MACHINE
Filed Nov. 23, 1933   11 Sheets-Sheet 7

INVENTOR
Ernest W. Stacey
By his Attorney
Victor Colt.

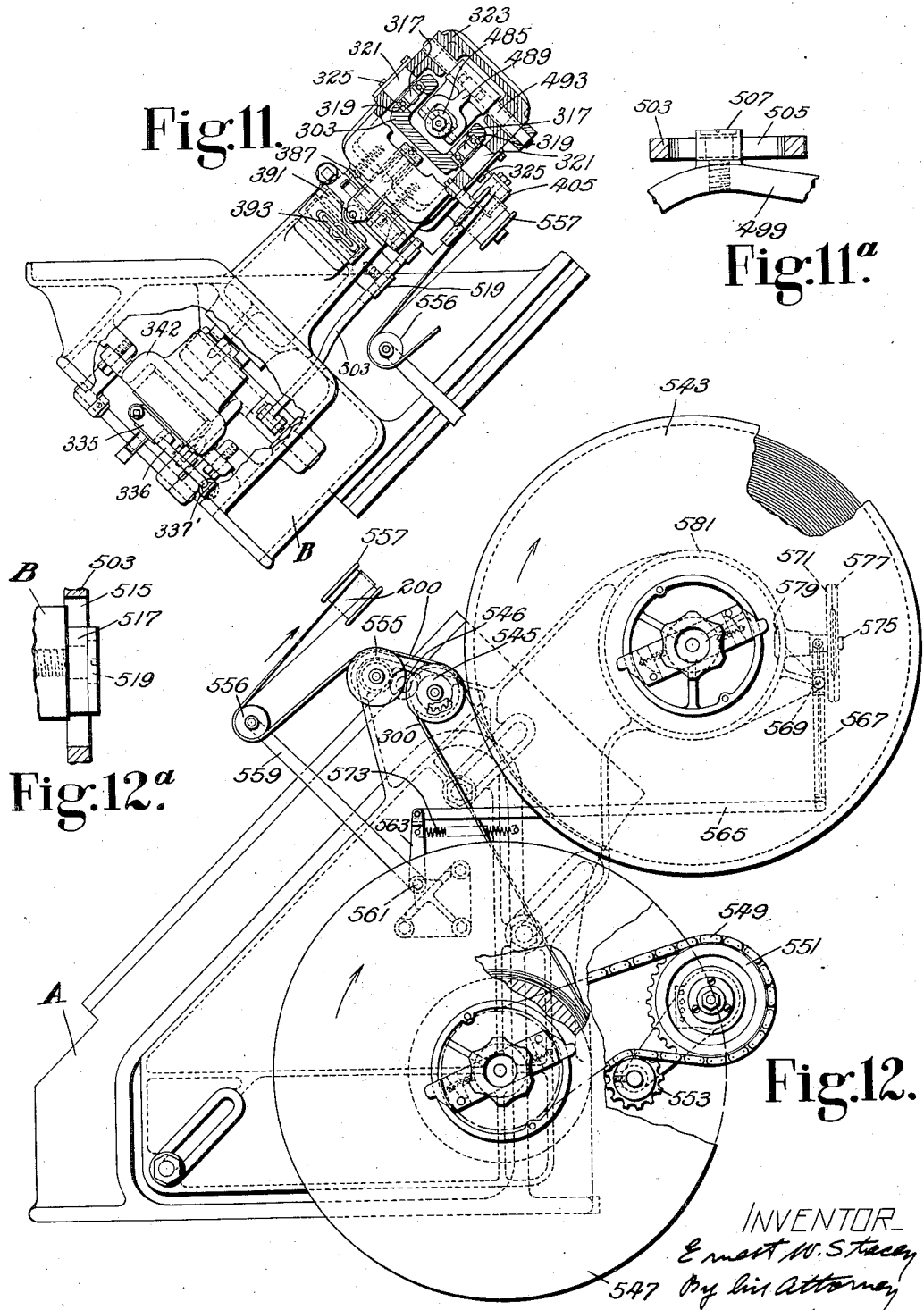

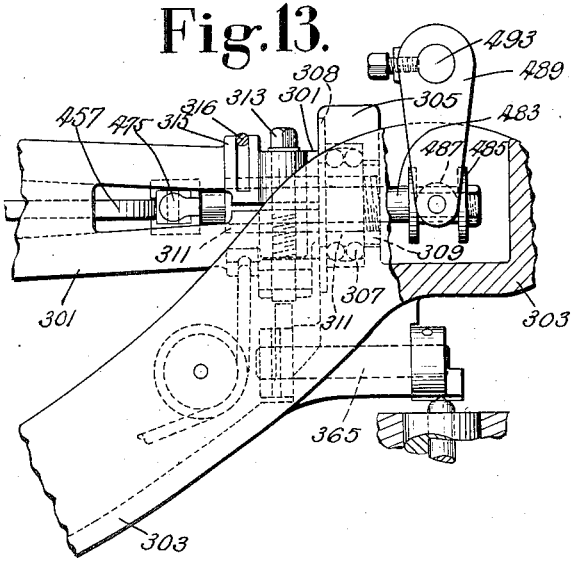
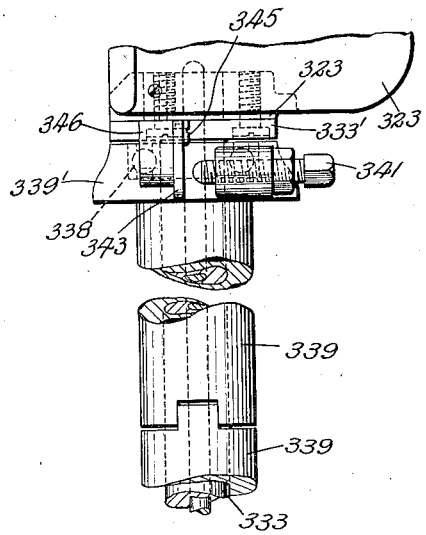
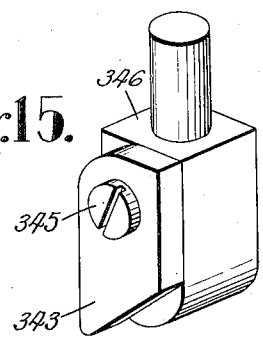
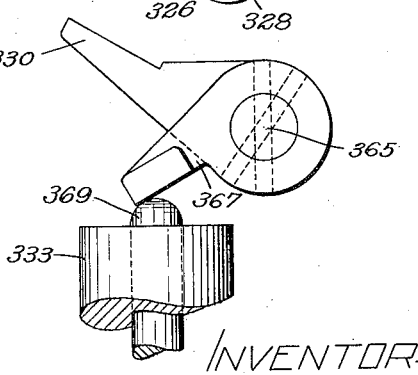
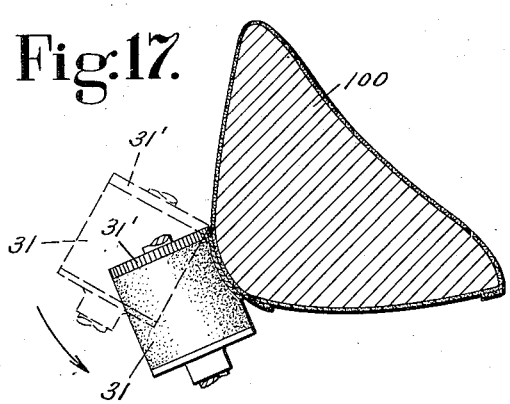

May 19, 1936.  E. W. STACEY  2,041,379
FOXING LAYING MACHINE
Filed Nov. 23, 1933  11 Sheets-Sheet 10

INVENTOR
Ernest W. Stacey
By his attorney
Victor Cobb

May 19, 1936. E. W. STACEY 2,041,379
FOXING LAYING MACHINE
Filed Nov. 23, 1933 11 Sheets-Sheet 11
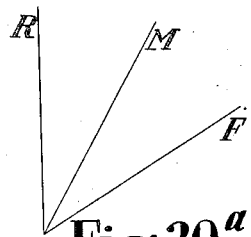
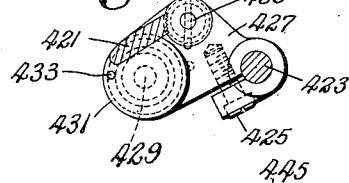
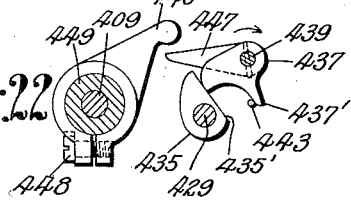
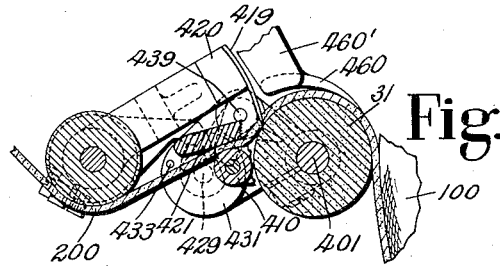
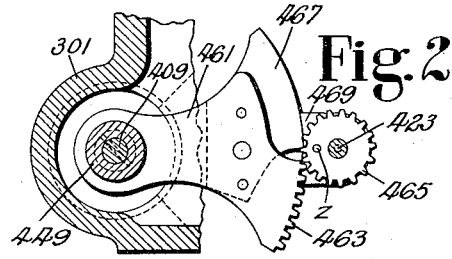
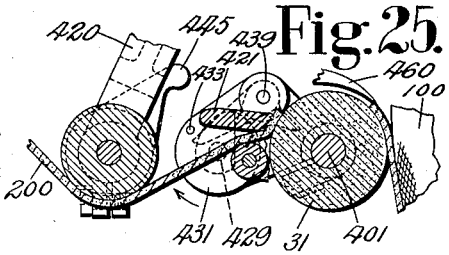
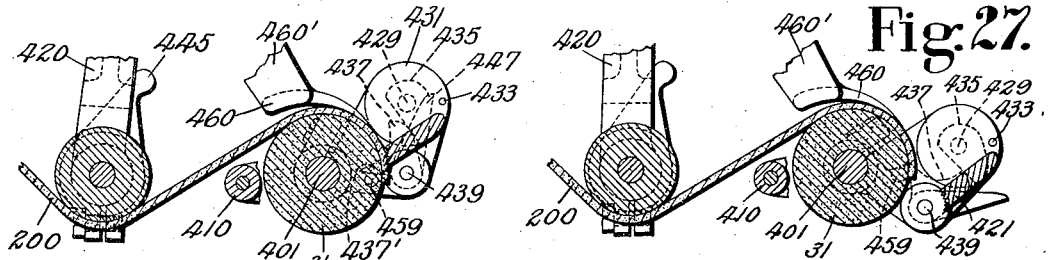
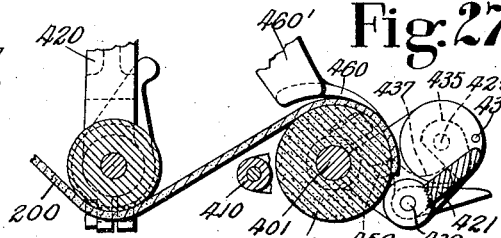
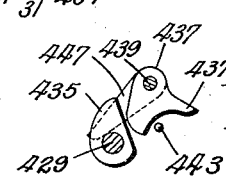

Patented May 19, 1936

2,041,379

UNITED STATES PATENT OFFICE 2,041,379

FOXING LAYING MACHINE

Ernest W. Stacey, Beverly, Mass., assignor to United Shoe Machinery Corporation, Paterson, N. J., a corporation of New Jersey Application November 23, 1933, Serial No. 699,423

78 Claims. (Cl. 12—1)

This invention relates to machines for use in the manufacture of boots and shoes and is herein illustrated as embodied in a machine for applying foxing to the lower margin or foxing area of a rubber-soled shoe.

In the manufacture of rubber-soled footwear having fabric uppers, such for example as tennis shoes, in which the soles are vulcanized to the upper, it is customary, after the shoe has been lasted but before the unvulcanized sole has been attached, to lay the narrow strip of unvulcanized rubber, known as a foxing, along the lower margin of the shoe, the lower part of the foxing being bent over upon the bottom of the shoe. After the foxing has been thus applied, the unvulcanized rubber sole is laid on the bottom of the shoe and the rubber is vulcanized. The foxing not only gives a neat appearance to the shoe but aids in securing a tight joint between the upper of the shoe and the sole.

The foxing is a narrow firmly strip of unvulcanized rubber which may very readily be distorted as it is pressed against the shoe. Consequently, if a uniform finished result is to be attained, each portion of the foxing should be subjected to substantially the same pressure against the shoe for the same length of time. According, therefore, to one feature of the invention, there is provided a holder for a shoe, a foxing-applying tool, means for causing the tool to press the foxing against the foxing area of the shoe with a substantially constant pressure, and means for imparting movement to the shoe holder in such manner as to cause the foxing area of the shoe to be traversed by the tool at a substantially constant linear velocity. In the illustrated construction, the tool is an idle roll caused by a spring to press the foxing against the shoe, and the shoe holder or jack has imparted to it movements of rotation while the foxing is being laid around the toe end and the heel end of a shoe, and substantially straight-line movements of translation while the foxing is being laid along the sides of the shoe, these movements being caused by a pinion which engages the teeth of a properly-shaped endless rack on the jack so that the tool traverses the shoe at a substantially constant velocity.

Due to the longitudinal curvature of the bottom of a shoe, the level of the foxing area at some localities is different from that at others, for example the level of the foxing area at the heel end of a shoe is different from that at the toe end. According to another feature of the invention, means are provided for tilting or rocking the shoe at proper times during its movements of translation to compensate for this difference in level. In the illustrated machine the shoe in its initial position has its bottom at the ball line and at the heel upon a flat bottom-rest, and the foxing is laid by a foxing-applying roll with its upper edge in a straight line along the lower margin of the shoe from the heel end of the shoe to the locality of the ball line; but, from the ball line forward around the toe end and back to the ball line, the foxing is laid with its upper edge curved to correspond to the curvature of the edge of the bottom of the shoe so that said upper edge is substantially equidistant at all points from the adjacent points on the edge of the bottom of the shoe. The foxing-applying roll not only applies the foxing to the shoe but draws the foxing from a coiled supply strip of indeterminate length past certain guide rolls. In order to pull the foxing strip evenly along, the axis of the foxing-applying roll should be maintained perpendicular to the direction in which the strip is pulled. In order to avoid the formation of wrinkles in the foxing, as it is laid on the foxing area of the shoe, the axis of the foxing-applying roll should be maintained at all times perpendicular to the upper edge of the foxing area. The laying of the foxing between the heel end of the shoe and the ball line presents no special difficulty since the upper edge of the foxing is laid in a straight line; but from the ball line around the toe portion of the shoe some relative movement between the foxing-applying roll and the shoe, heightwise of the shoe, should be provided for. In the illustrated machine, during the laying of the foxing around the toe portion, the shoe is first rocked up on its toe and then rocked back to initial position, these rocking movements being so timed with respect to the movements of translation and rotation of the shoe that the desired angular relation between the axis of the foxing-applying roll and the upper edge of the foxing area is maintained substantially constant.

It is usual not only to apply a foxing to the foxing area of the shoe and to press it into place, but to indent or "stitch" the upper edge of the foxing. According to another feature of the invention, there is provided a combined tool comprising a deformable applying roll and a rigid indenting wheel. In the illustrated construction, a toothed indenting wheel is fast to the upper end of a spindle, while below the tool and also fast to the spindle is a rubber applying roll. With this construction, the toothed wheel indents the upper edge of the foxing, and the periphery of the rubber roll conforms to the varying contour of the foxing area of the shoe and presses the body portion of the foxing into place.

In machines of the general type of the present machine in which foxing is supplied in the form of a long strip, wound in a coil upon a reel, and the free end of the strip is guided to the foxing-applying tool and applied to the shoe, the strip is severed at or near the end of the foxing-applying operation. Prior to the presentation of another shoe to the machine, the severed end of the foxing strip should be fed forward a short distance to bring it into position to be applied to the next shoe presented to the machine; and in accordance with a further feature of the invention, mechanism for so feeding it is provided. In the illustrated construction, the foxing strip is severed at a locality which is in contact with the foxing-applying roll, and the severed end is then pressed against the roll by a gripper which, acting through the strip, imparts a partial rotation to the roll to feed the end of the strip into the desired position ready for application to the next shoe.

These and other features of the invention, including certain details of construction and combinations of parts, will be described as embodied in an illustrated machine and pointed out in the appended claims.

Figure 3:
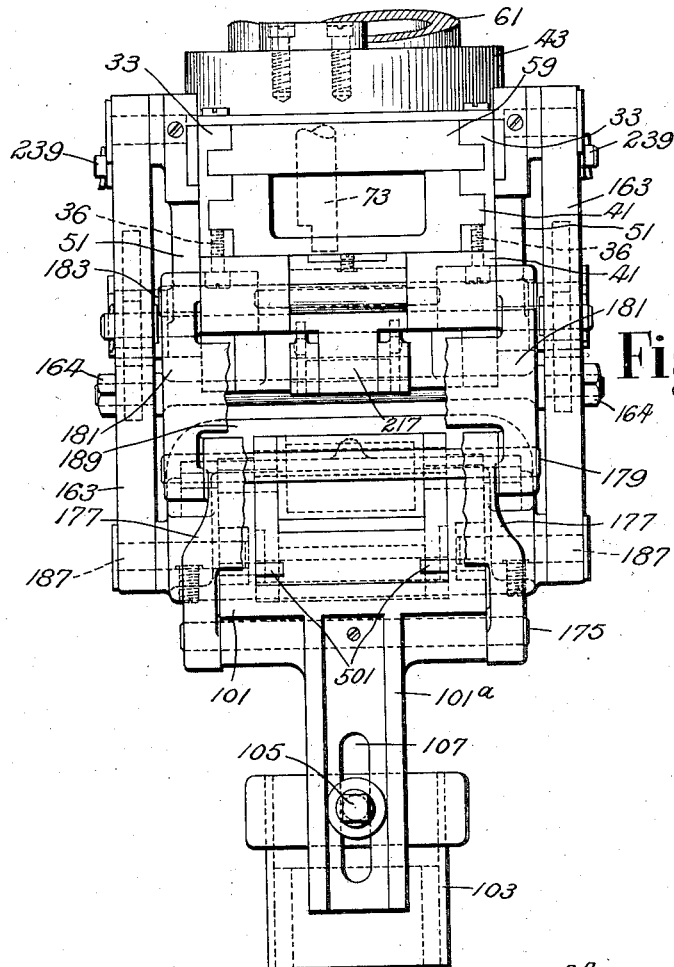
Figure 4:
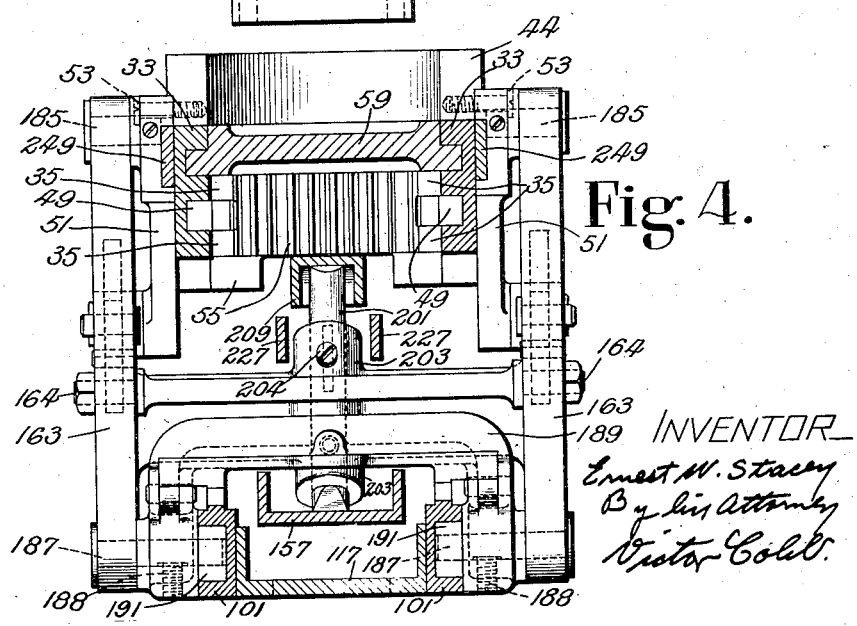
Figure 9:
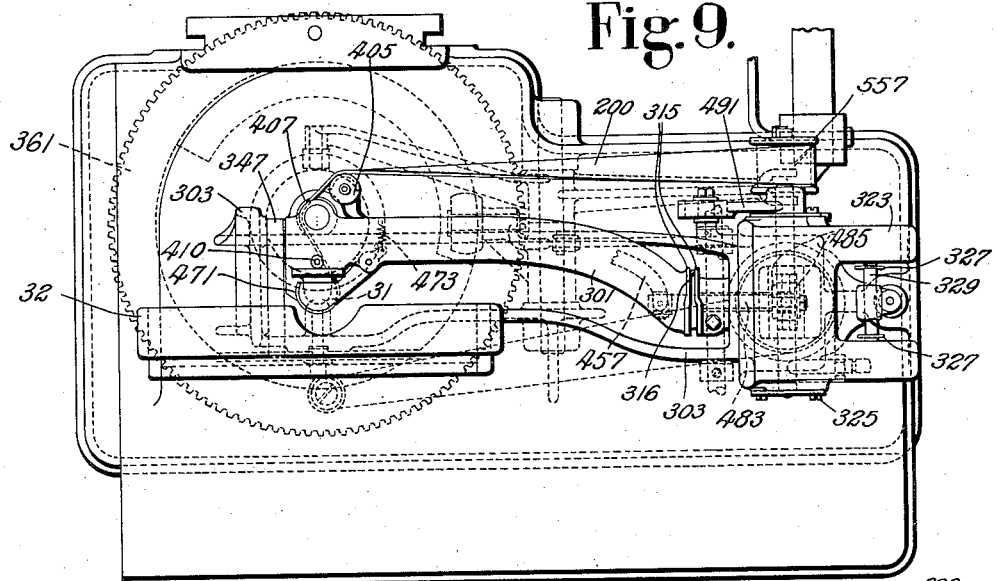
Figure 10:
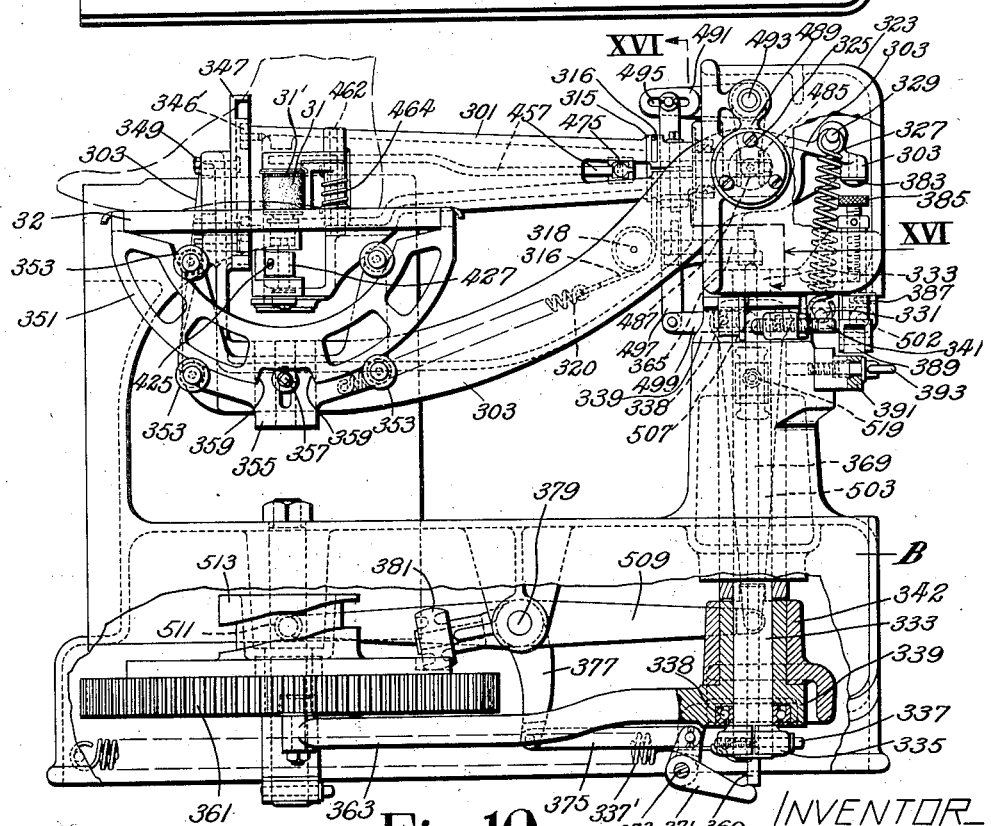
Figure 18:
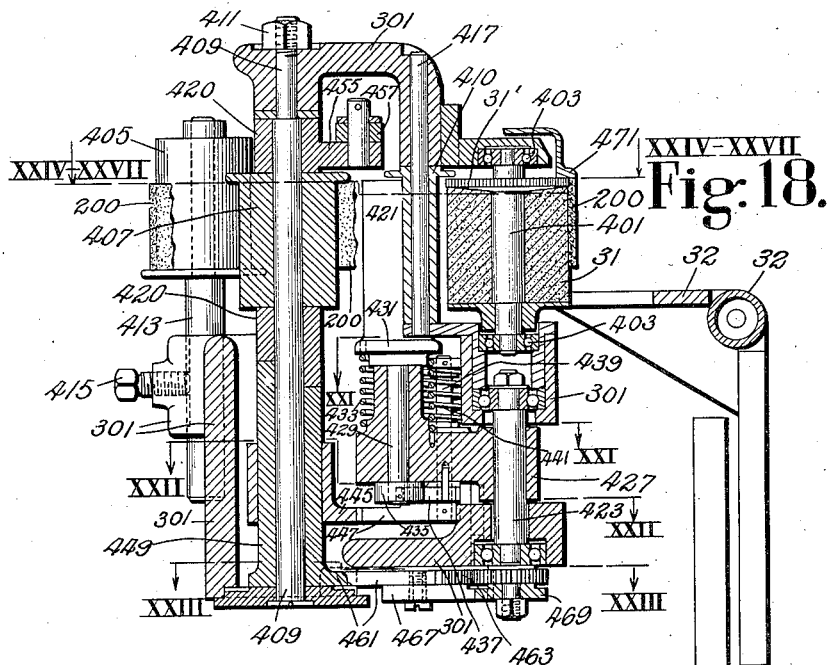
Figure 19:
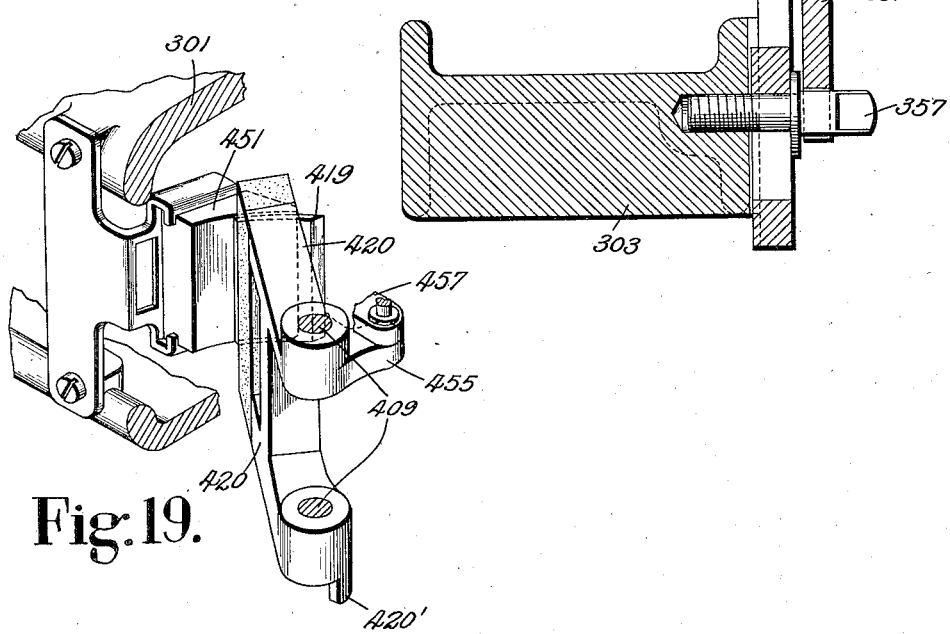

Referring now to the accompanying drawings,

Fig. 1 is an elevation of the upper part of a machine in which the present invention is embodied, a shoe being shown in process of having a foxing applied around its toe end, Figs. 1a to 1f show consecutively in plan and elevation certain stages in the movements of the shoe, Fig. 2 is a transverse section taken just above the jack looking down upon the jack structure, Fig. 3 is a rear elevation of the jack, Fig. 4 is a transverse section of the jack on the line IV—IV of Fig. 6, Fig. 5 is an elevation of the jack and a shoe, the shoe being in the same position in which it is shown in Fig. 1d, Fig. 6 is an elevation of a jack and a shoe, the shoe being shown in the same position as in Fig. 1e, Fig. 7 is a longitudinal section on the line VII—VII of Fig. 6, Fig. 8 is a longitudinal section on the line VIII—VIII of Fig. 6, Fig. 9 is a plan of the bottom-rest for the shoe, the foxing-applying roll and the mechanism for supporting and operating these members, Fig. 10 is an elevation of the parts shown in Fig. 9, a shoe being shown in broken lines in process of being operated upon, Fig. 11 is a view partly in section and partly in elevation of the mechanism for operating the bottom-rest and the foxing-applying tool, Fig. 11a is a detail of part of mechanism for operating the knife which severs the foxing strip, Fig. 12 is an elevation of the mechanism for unwinding the foxing strip from the supply reel by which a coil of it is carried, Fig. 12a is a detail of part of the mechanism for operating the knife, Fig. 13 is an elevation of portions of the arms which carry respectively the bottom-rest and the foxing-applying tool and of portions of the knife-actuating mechanism, certain parts having been broken away, Fig. 14 is an elevation of a portion of the mechanism for swinging the two arms toward and away from the shoe, Fig. 15 is a detail in perspective of the lug 343 shown in Fig. 14, Fig. 16 is a detail in elevation of the mechanism for tilting the foxing-applying roll, the tool-carrying arm and the knife-operating rod being shown in section, Fig. 17 is a detail showing the foxing-applying roll in two positions in which it contacts with a shoe, Fig. 18 is a sectional view of the mechanism for feeding the foxing strip, Fig. 19 is a perspective showing the mounting of the knife, Fig. 20 is a plan of the mechanism shown in Fig. 18, the heel end of a shoe being shown in section in process of being operated upon, Fig. 20a is a diagrammatic view showing the front, rear and middle positions of the knife, Fig. 21 is a section on the line XXI—XXI of Fig. 18 showing part of the mounting of the gripper, Fig. 22 is a section on the line XXII—XXII of Fig. 18 showing part of the mechanism for controlling the movements of the gripper, Fig. 22a is a detail principally in plan of certain parts shown in Fig. 22 but with these parts in other positions, Fig. 23 is a section on the line XXIII—XXIII of Fig. 18 showing part of the mechanism for operating the gripper, and Figs. 24 to 27 are sections on the line XXIV—XXVII of Fig. 18 showing how the foxing strip is severed and how the severed end is fed forward into position to be applied to a succeeding shoe.

The illustrated machine is similar in many respects to the machine disclosed in application, Serial No. 663,121, filed March 28, 1933, in my name, which shows a machine for applying a coating of cement to the foxing area of a lasted shoe, the present machine being substantially like that of the application in its construction and mode of operation, except that the jack of the present machine differs somewhat from that of the machine of the application and a foxing-applying mechanism has been substituted for the cement-applying mechanism. Before proceeding to describe what is new, a general description of what is old, together with brief references to what is new, will be given. Referring first to Fig. 1, which shows in elevation the upper part of the machine, the machine comprises a base A, an adjustable casting B for the foxing-applying mechanism, and a head C bolted to the base. Carried by the head C is a shoe support or jack D by which the shoe is held and which is moved to present the foxing area of the shoe to the foxing applying mechanism. The shoe is held right side up with its longitudinal axis inclined at about 45°, and the casting B is mounted on inclined guideways formed on the base to permit the casting to be adjusted for shoes of different heights. A foxing-applying tool in the form of a rubber roll 31, which takes the place of the cement-applying tool of the machine of the application, is mounted for yielding movement to and from the shoe, for movement heightwise of the shoe and for rocking movement so as to follow the contour of the foxing area as the shoe is moved past it; and the jack is actuated in such a manner as to cause the foxing area of the shoe to travel past the tool. In Fig. 1, the shoe is shown locked to the jack and in process of having a foxing applied around the toe portion thereof, the shoe having been rocked up on its toe portion in a manner not possible of accomplishment with the foxing-cementing machine of my prior application. The machine comes to rest, however, with the shoe unlocked from the jack, with the foxing-applying tool withdrawn from the shoe, and with the shoe at right angles to the position shown in Fig. 1 and not tipped up.

In the operation of the machine the operator presents a shoe to the jack, holds it in place and steps upon a treadle, whereupon the following movements take place: The shoe is locked rigidly to the jack, the foxing-applying tool is moved into contact with the shoe, and the jack begins what will be termed its "forward movement". The forward movement of the jack causes the foxing area of the shoe to be traversed by the tool from the point at which the tool first presses the leading end of the foxing against the shoe around the shoe and back to a point a little beyond the starting point so that the ends of the foxing will overlap somewhat. The foxing-applying operation is now complete, but the parts must be returned to their initial positions. To this end, the tool is withdrawn from the shoe, and the movement of the jack is reversed. This backward movement of the jack continues until the shoe is returned to its initial position when it stops, and the shoe is unlocked. Thus the operator has only to present a shoe to the jack and to depress the treadle, whereupon the shoe is locked in place, moved past the tool, returned to initial position, unlocked and brought to rest. The machine may be adjusted to cause the laying of the foxing to begin at different localities on the foxing area, but commonly it is adjusted to cause the laying to begin at a point near the heel end of the shoe such as that indicated by the position of the tool 31 in Fig. 1a.

Figs. 1a to 1f each show a shoe in plan and elevation in process of being operated upon. In the present machine, the shoe is rocked up on its toe and held in this position during the application of foxing around the toe portion as shown in elevation in Figs. 1c and 1d. In the foxing-cementing machine of my prior application there was no rocking of the shoe. Disregarding, for the present, this rocking movement and assuming that the shoe 100 has been locked to the jack and that the tool (herein shown as the foxing-applying tool 31) has brought the leading end of the foxing into contact with the foxing area of the shoe at the point indicated in Fig. 1a, the jack begins its forward movement to impart forward movement to the shoe, various stages of said forward movement being shown in plan in Figs. 1a to 1f. The shoe first swings 180° counterclockwise about its heel end to the position shown in Fig. 1b; it then moves straight to the left until it reaches the position shown in Fig. 1c. It then swings 180° counterclockwise about its toe end to the position shown in Fig. 1d. It then moves straight to the left through the position shown in Fig. 1e and is rotated counterclockwise about its heel end to the position shown in Fig. 1f. The foxing has thus been laid all around the shoe and has been overlapped around the heel portion. The forward movement of the shoe is now complete. The tool is withdrawn from the shoe; the jack reverses its movement, and the shoe is swung clockwise about its heel end until it reaches the position shown in Fig. 1a when it comes to rest. The overlap of the foxing may be controlled by certain adjusting mechanism so that it will be greater or less than that shown or even in such manner that there is a gap between the ends of the foxing; and the position of the shoe at which the laying begins may also be varied so that the overlap may be located where desired.

The jack

The jack, its mounting and its manner of movement are in general like the jack, the mounting and the manner of movement of the machine of the application except that in the present construction the jack is not only actuated as a whole to cause the shoe to move in the manner described above but is provided with improved shoe-locking or shoe-holding mechanism and with mechanism for rocking or tilting the shoe up on its toe portion, as shown in Fig. 1, when the foxing is being laid about the toe portion of the shoe. Before proceeding to describe these new features, the construction of the jack which is the same or substantially the same as that of the jack of the machine of the application will be described. The base of the jack (Fig. 2) is a rigid elongated boxlike structure open at the top and bottom and having side walls 33 each of which is provided with a straight rack in the form of two rows of teeth 35 with one row spaced above the other. Only the two upper rows appear in Fig. 2, but portions of both rows appear in Fig. 4. The two rows of teeth on one side wall 33 thus form in effect a single straight rack; and the two rows of teeth on the opposite wall 33 form another straight rack. Between the side walls at the extreme toe end of the jack is a block 37 fastened in place by screws, one of which is shown at 39, said block having a depending portion to support part of the mechanism which locks the shoe in place as will be described later. Between the side walls at the rear end of the jack is a second block 41 (Figs. 3 and 6) having ribs which extend into suitably shaped grooves formed in the side walls 33 and held firmly in place by set screws 36, said block 41 also having a depending portion to support part of the shoe-locking mechanism. Rigidly fastened to the heel end of the jack (Fig. 2) is a guide member 43 which is adapted, together with another similar but adjustable guide member 44 near the toe end of the jack, to be held at times in contact with a straight guide rail 45 carried by the head of the machine and thus to guide the jack in its movement.

The effective portion of the guide member 43 is U-shaped, the outline of the curved end of this member, inside and outside, being semi-circles. The block 41 (Fig. 3), which is spaced below the guide member 43, has a wall which is U-shaped in cross-section and registers with the inner U-shaped wall of the guide member 43 (Fig. 2). Upon the U-shaped wall of this block is formed a rack the teeth 47 of which have the same pitch as the teeth of the straight racks on the side walls 33 of the base and form a continuation of these straight racks, certain teeth at the ends of the U-shaped rack extending between the two rows of teeth which constitute a straight rack on each of the walls 33. The toe end guide member 44, which is like the heel end guide member 43, is mounted near the toe end of the jack for adjustment lengthwise of the jack. Located in spaced relation beneath the guide member 44 (Fig. 4) is a block 49 which has a sliding tongue-and-groove connection with the side walls 33 and is rigidly fastened to the guide member 44 so as to be adjustable with it by two plates 51 and screws 53 (Figs. 5 and 6). The effective portion of the toe guide member 44 is U-shaped like the heel guide member 43; and the block 49, like the block 41, has on its inner U-shaped wall a U-shaped rack 55. The two straight racks 35 with the two U-shaped racks thus form an endless rack having straight sides and semi-circular ends, the pitch of the teeth of this endless rack being the same throughout so that, when the rack is engaged and driven by a pinion rotated at constant velocity, the part of the shoe being operated upon travels at a constant linear velocity past the foxing-applying tool. The toe end guide member 44 is adjustably fastened to the base of the jack by a key which may be slid between the teeth on the straight racks 35, the lower portion of this key being shown at 56 (Figs. 5 and 6). Thus, whatever may be the position of the adjustable toe guide member 44, there is always provided on the jack an endless rack having two straight parallel sides and two semi-circular ends.

The jack is suspended from the head C (Fig. 1) of the machine in such manner that it is always free, when permitted to do so, either to slide in the direction of its length or to rotate about the center of one or the other of the curved outer faces of the guide members 43, 44 and is driven, through the endless rack, by a pinion 57 (Fig. 2) which holds the guide member 43 or the guide member 44 or both against the guide rail. Formed in the side walls 33 (Fig. 4) are two long guide grooves into which enter respectively two flanges formed on opposite sides of a rectangular plate 59 which is integral with a sleeve 61 (Fig. 2) rotatably mounted on a depending post 63. The post is rigid with the head C (Fig. 1) of the machine and extends obliquely downward, the sleeve 61 and its integral plate 59 being held from sliding off from the bottom of the post by a plate, not shown, fastened to the bottom of the post. With this construction, the jack may slide lengthwise of the plate 59; and the jack, the plate and the sleeve may rotate as a whole about the post 63. Extending downward through the post is a hollow shaft 65 eccentric to the post having fast to its lower end the pinion 57 which meshes with the teeth of the endless rack. This hollow shaft (Fig. 1) has fast to its upper end a beveled gear 67 meshing with a small bevel gear 69 on the upper end of an upright shaft 71 which is rotated first in one direction and then in the other to impart, first a forward movement, and then a reverse movement to the jack, in the manner which has been described, and is finally brought to rest. Slidably mounted in a bore in the hollow shaft 65 is a push rod 73 which controls the mechanism for locking the shoe to the jack. The upper end of this rod (Fig. 1) is pivoted to a lever 75 which is swung first up and then down at the proper time. This rod is pushed down when the machine comes to rest and is held down until the operator has removed a shoe which has been operated upon, presented a new shoe to the jack and depressed the treadle of the machine, whereupon the rod is pulled up to cause the shoe to be locked to the jack.

Referring again to Fig. 2, the jack is shown approximately in the position it occupies when the shoe is in the position shown in Figs. 1e and 6. The foxing has been laid around the heel end of the shoe, along one side thereof, around the toe portion and partly along the other side. The jack is moving to the left and will continue so to move until the inner semi-cylindrical wall of the heel guide member 43 fits around the sleeve 61, whereupon it will rotate counterclockwise through 180° until the shoe is in the position shown in Fig. 1f. At that position the laying of the foxing will have been completed, the foxing-applying tool will be withdrawn, and the rotation of the pinion 57 will be reversed to swing the jack clockwise through 180° to bring the shoe back into its initial position (Fig. 1a). When the jack starts its movement, the semi-cylindrical inner face of the heel guide member 43 is in engagement with the sleeve 61, and the shoe is in the position shown in Fig. 1a. Disregarding for the moment the tilting of the shoe and assuming that rotation in the direction shown has been imparted to the pinion 57, the jack first swings counterclockwise about the center of curvature of the heel guide member 43 through 180° until the toe guide member 44 strikes the guide rail 45. During this movement the shoe reaches the position shown in Fig. 1b. The jack then moves straight to the left until the semi-cylindrical face of the toe guide member 44 fits around the sleeve 61. The shoe is then in the position shown in Fig. 1c. The jack then swings counterclockwise about the center of curvature of the toe guide member 44 to bring the shoe into the position shown in Fig. 1d. The jack then moves straight to the left carrying the shoe through the position shown in Fig. 1e until the heel guide member 43 fits around the sleeve 61 again, whereupon the jack swings counterclockwise through 180° to bring the shoe into the position shown in Fig. 1f. At that point the foxing-applying tool is withdrawn, and the direction of rotation of the pinion 57 is reversed to swing the jack clockwise about its heel end until it returns the shoe to the position shown in Fig. 1a and comes to rest. The machine as thus far described, together with the jack and the mechanism for operating it, with the exceptions which have been noted, are or may be the same as the corresponding parts of the machine of my prior application and will not be further described, reference being made to that application for details of construction.

As has been explained, the present jack is provided with improved shoe-locking mechanism and with mechanism for tilting the shoe up on its toe end when the toe portion of the foxing area is being operated upon; and this construction will now be described in detail. Referring to Fig. 6, a generally rectangular supporting frame 101 has a downturned rear end 101ᵃ having fastened to it an abutment 103 shaped to engage the rear of the shoe, said abutment having a concave face lined with felt or some similar substance to prevent marring of the shoe. A screw bolt 105, which passes through a slot 107 (Fig. 3) in the downturned end 101ᵃ and is threaded into the abutment 103, permits vertical adjustment of the abutment. In Fig. 4, this frame 101 is shown in cross-section. It is open at the top and bottom, and at its ends, below the level of the lowest portion shown in that figure, it has integral cross-pieces. Referring again to Fig. 6, one of these cross-pieces has the downturned end 101ᵃ and the other a depending portion 101ᵇ at the forward end of the frame. The last 200 (Fig. 6) is of the type used in rubber shoe factories in which the shoes are placed in an oven and vulcanized after they have otherwise been finished. The slot 109 in this hollow last will be termed a "last-pin-hole", since it serves the purpose of the usual last-pin hole in a wooden last used in an ordinary shoe factory. Into this hole extends a member 111 which will be termed a "last-pin". This member is flat and has oppositely facing teeth 113 adapted to engage the opposite end walls of the last-pin hole when the shoe has been presented with the last-pin in the hole, and the last-pin has been swung about its pivot 115. When the parts are in the position shown, the pin is cramped in the hole and the shoe is locked firmly in position by the cramping of the last-pin in the hole and by reason of the fact that the rear end of the shoe is pressed against the abutment 103. The last-pin is pivoted about a small horizontal rod 115 mounted in one end of a long bar or link 117 which is U-shaped in cross-section as shown in Fig. 4, said bar having adjustably fastened by a screw bolt 119 to its under side an inclined holder 121 (Fig. 6) in which is adjustably fastened by a screw bolt 123 a stem 125 to the lower end of which is pivoted a toe rest 127 provided with a felt lining. The last-pin 111 is slidably adjustable on the small rod 115 about which it is pivoted and is held in position lengthwise of the rod by a spring-pressed latch 129 which may be engaged between any two of a row of teeth 131 (Fig. 8). In this figure are shown the leaf spring 133 which carries the latch at one end and the screw 135 which fastens the spring at its other end to the bar 117. Returning to Fig. 6, the bar 117, most of which is located in the opening in the frame 101, is movable lengthwise and is there shown in its right-hand position. If it is moved to the left it will move the toe rest 127 to the left and will swing the last-pin 111 counterclockwise whereupon the shoe will be released. The bar 117 is pivoted at its left-hand end at 137 to the spaced depending arms of a bell-crank lever 139 the hub of which is rotatable on a pin 141 carried by upstanding spaced lugs on the frame 101. The right-hand end of the bar 117 is pivoted at 143 to the depending spaced arms of a lever 145, which is a second bell-crank lever, the hub of the lever 145 being rotatable on a pin 147 carried by upstanding lugs on the rear end of the frame 101. The bar 117 may thus be swung about the axes of the pins 141, 147 and thus be moved to the right to lock the shoe in the jack, or to the left to unlock the shoe. It is urged at all times into its right-hand position by a torsion spring 149 coiled about the pin 141, a stop pin 501 carried at the right-hand end of the frame 101 being provided to limit the swinging movement of the bell-crank lever 145 to the right so that, in case the shoe-clamping mechanism is for any reason operated without presenting a shoe to the jack, the bell-crank lever 145 will be prevented from swinging very far. The torsion spring 149 is best shown in Fig. 7. The pin 141 has fast to it a collar 151 and loose upon it a collar 153, the torsion spring 149 having one end extending into a hole in the fast collar 151 and the other end extending through a hole in the loose collar 153 and into a hole in one of the two upper arms of the bell-crank lever 139. The pin is fastened to the frame 101 by a set screw 155. After the set screw has been loosened, the pin 141 may be turned to vary the tension of the spring 149. Referring again to Fig. 6, the upper arms of the bell-crank levers 139, 145 are connected by a long link 157 and pivots 159, 161 so that, if this link is pushed down at any time, the bell-crank levers will swing counterclockwise to move the bar 117 to the left so as to unlock the shoe.

Referring to Fig. 4 the cross-sectional U-shape of the bar 117 and the link 157 will be seen. Referring to Fig. 7, it will be seen that the ends of the link 157 extend respectively into the spaces between the upper arms of the bell-crank levers 139, 145 and that the hubs of these two bell-crank levers are located between the sides of the frame 101.

Returning again to Fig. 6, the frame 101, with all the parts just described as being mounted upon it, is pivotally suspended in a manner presently to be described at the lower ends of two links 163, one of which is shown in Fig. 6 and both of which are shown in Fig. 4, so that the frame 101 may be tilted to rock or tilt the shoe up on its toe portion, as shown in Fig. 5, at the proper times. In order to steady the frame 101 when such tilting movement is imparted to it, it is pivoted at its toe end at 165 to the forked end of a link 167, the other end of the link carrying a rod 169 to which is pivoted the lower end of a link 171, the upper end of this link being forked and pivoted on a rod 173 carried by the block 37 which is fastened between the toe ends of the side walls 33 of the jack. The depending portion 101a at the heel end of the frame 101 is pivoted at 175 to the forked lower end of a link 177 the upper end of which is pivoted at 179 to the lower end of a link 181, the upper forked end of which is pivoted at 183 to a lug depending from the block 41 which is fastened between the heel end of the side walls 33 of the jack. As has been stated, the purpose of the links 167, 171 at the toe end of the frame 101 and the links 177, 181 at the heel end is merely to steady the frame 101 and thus to insure that it shall not rock sidewise.

This frame, as has been stated, is suspended at the lower ends of the two links 163 for lengthwise rocking movement. These two links are fastened together by a cross-bolt 164 and at their upper ends are pivoted at 185 respectively to the plates 51 which are rigid with the toe end guide member 44. This member 44, it will be recalled, is adjustable lengthwise of the jack to provide for shoes of different lengths; and, when this member is adjusted, the pivotal connections of the lower ends of the links 163 with the frame 101 must also be adjusted so that a proper rocking movement will be imparted to each shoe whatever its length. The lower ends of the links, therefore, are not pivoted directly to the frame 101. Instead, they are pivoted about alined rods 187 fastened by set screws 188 in the depending arms of a bridge member 189 which spans the frame 101 and is adjustable along it, said rods having mounted on their inner ends blocks 191 (Fig. 4) which are received in tracks formed in the outer faces of the sides of the frame 101. The bridge member 189 has pivoted to it about alined pivots 193 (Fig. 6) a pawl 195 having two alined teeth which are adapted to enter the alined spaces between the teeth of two racks 197 (see also Fig. 7) formed on the upper surfaces of the sides of the frame 101, a compression spring 199 normally holding the pawl operative as shown. This construction thus permits the bridge 189 to be adjusted along the frame 101 when the toe end guide member 44 is adjusted lengthwise of the jack to provide for shoes of different lengths.

In Fig. 6 the shoe is locked to the jack, and it has been explained that it may be unlocked by pushing down the link 157 to cause the bell-crank levers 139, 145 to move the bar 117 to the left. This pushing down of the link 157 is caused by pushing down a rod 201 (see also Fig. 4) which is freely slidable through the core of a heavy yoke-link 203, the hollow core having threaded through its wall a screw 204 the stem of which extends into a slot in the rod 201 to prevent the rod from turning. The upper and lower ends of the rod 201 are sharpened to provide thin edges, the lower edge engaging the upper surface of the link 157 and the upper edge engaging the under surface of a link 209 so that, when the link 209 is pushed down, in a manner presently to be described, the link 157 will be pushed down to release the shoe. The heavy yoke-link 203 (Fig. 6) carries at its upper end a pivot rod 211 which extends through bores in the plates 51. At its lower end it is rotatably mounted on two alined studs 213 which are carried by the bridge member 189 and are located in the same tracks in the frame 101 in which the blocks 191 are located. The link 209, which is pushed down to exert a downward push through the rod 201 to release the shoe, is pivoted at one end at 215 (Fig. 6) to the upper arm of a bell-crank lever 217 which is pivoted to the block 41 at 219. The other end of the link 209 is pivoted at 221 to the upper end of a bell-crank lever 223 which is pivoted at 225 between the outer ends of lugs which are integral with the block 37. A long link 227 is pivoted at its right-hand end to the lower arm of the bell-crank lever 217 and at its left-hand end to the lower arm of the bell-crank lever 223, the purpose of this link 227 being merely to prevent the link 209 from changing its inclination when it is pushed down. The link 209 is pushed down by the push rod 73 (Figs. 1 and 3) at the end of the operation on the shoe, as has been described above, to release the shoe. It is pulled up when the operator has presented another shoe and has stepped upon the treadle, the mechanism for operating the push rod 73 being the same as in the machine of my prior application and not being described in detail herein.

It has been explained above that the shoe is rocked up on its toe portion and held in this position, as shown in Fig. 5, while the foxing is being laid around the toe portion, the reason for providing this construction being to cause the foxing to be laid smoothly without wrinkles about the toe portion of the shoe. By reference to Fig. 10 it will be seen that the shoe, before being rocked up on its toe, rests at its ball line and heel upon the flat-topped bottom-rest 32, the shoe being always in this position when the foxing is being applied at any locality between the ball line and the heel end of the shoe. The result, as shown in Figs. 5 and 6, is that the upper edge of the applied foxing from the heel end of the shoe to about the ball line is straight and does not follow the contour of the lower edge of the shoe. Around the toe portion of the shoe, however, the foxing is laid with its upper edge corresponding to the contour of the lower edge of the shoe; and, to cause the foxing to be applied thus around the toe portion of the shoe, the shoe is gradually rocked up into the position shown in Fig. 5 and then gradually rocked down again into the position shown in Fig. 6. Referring now to Figs. 1b, 1c, and 1d, it will be seen that the shoe is rocked up on its toe portion while the shoe is moving heel foremost and that it is held rocked up while the shoe is being swung through 180° around its toe end. The position shown in Fig. 5 corresponds to that shown in Fig. 1d, the shoe having been rocked up on its toe portion previously while moving to the left, heel foremost, as indicated in Figs. 1b and 1c. This rocking of the shoe is caused by swinging the links 163 from the position shown in Fig. 6 to that shown in Fig. 5; and the shoe is rocked back into its initial position by swinging the links 163 from the position shown in Fig. 5 to that shown in Fig. 6. It should be noted that Fig. 6 shows the shoe after it has passed the position shown in Fig. 5, and corresponds to the position shown in Fig. 1e.

The swinging of the links 163 to rock the shoe up on its toe portion is caused automatically by the sliding movement of the jack while the jack is moving the shoe heel foremost; and the returning of the shoe to initial position results from the sliding movement of the jack while it is moving the shoe toe foremost. To this end, two bell-crank levers, one of which is shown at 229 in Figs. 5 and 6, are pivoted about alined pivots, one of which is shown at 231, to the plates 51 which are rigid with the guide member 44, said levers being connected by links, one of which is shown at 233, to the links 163. Tension springs 235 connect the lower arms of these bell-crank levers 229 with pins 237 driven into the hubs of the links 163. The tension springs 235 tend at all times to rock the bell-crank levers 229 into and hold them in the position shown in Fig. 6. It will be noted that each of the short links 233 and the horizontal arm of the bell-crank lever to which it is pivotally connected form a toggle of which the pivotal connection is the knuckle. The springs 235 act to pull these toggles down past their dead centers until the short links 233 contact with stop pins, one of which is shown at 233' carried respectively by the links 163. The upper arms of the bell-crank levers 229 are pivoted about alined pivots 239 respectively to one of the ends of two arms 241. The other ends of these arms 241 are pivoted about alined studs 243 carried at opposite downturned ends of a cross-bar 245, the arms being held on the studs by nuts 247. The cross-bar 245 extends across the tops of the two side walls 33 and is slidable longitudinally along these walls. Fastened to the cross-bar 245 near its opposite ends are two slide bars 249 which are slidably mounted in guideways in the plates 51 and act to steady the cross-bar 245 in its sliding movement. The cross-bar 245 has a depending split lug near its middle through which is threaded the stem of an abutment 251 (Fig. 2) held in adjusted position by a pinch-bolt 252, said abutment being adapted at times to engage one end of the rectangular plate 59 which is integral with the sleeve 61 and upon which the jack slides. This plate, it will be recalled, rotates when the jack rotates but is stationary when the jack is moving lengthwise; and when, with the jack moving lengthwise and the shoe moving heel foremost as shown in Fig. 1b, the abutment 251 contacts with the end of the plate 59 the movement of the cross-bar 245 with the jack is arrested while the jack continues its movement to the left. The effect of this is to exert a pull through the links 241 on the bell-crank levers 229 to swing the links 163 into the position shown in Fig. 5. It should be remembered, however, that the toe end of the shoe at this time was pointed to the right and that the shoe was moving heel foremost to the left. This swinging of the links 163, due to the manner in which the link 203 connects the plate 51 with the bridge member 189, causes the shoe to rock approximately about the center of longitudinal curvature of the toe portion of the bottom of the shoe in such manner that, as the shoe moves bodily past the foxing-applying roll, the axis of that roll is maintained substantially perpendicular to the upper edge of the foxing area.

The end of the plate 59 remains in contact with the abutment 251 while the shoe is swung around the toe portion from the position shown in Fig. 1c to that shown in Fig. 1d. The jack now moves to the left, the springs 235 holding the abutment in contact with the plate 59 for an interval during which the links 163 are swung back into their initial position in which they are substantially perpendicular to the longitudinal axis of the shoe. The shoe has then been rocked back to initial position. Further movement of the jack to the left causes the abutment 251 to recede from the plate 59 as shown in Fig. 6.

The entire movements of the shoe as they take place successively will now be described. The shoe is presented to the jack with the last-pin 111 (Fig. 6) in the last-pin hole and the bottom of the shoe resting at the ball line and at the heel upon the flat bottom-rest 32. The operator then depresses a treadle whereupon the push rod 73 is lifted to permit the coiled spring 149 (Figs. 6, 7) to move the bar 117 to the right thereby causing the last-pin 111 to be swung clockwise and the heel of the shoe to be pushed against the abutment 103. The foxing-applying tool 31 (Fig. 1) is moved to press the leading end of the foxing strip into contact with the foxing area of the shoe at the position indicated in Fig. 1a, and the shaft 71 (Fig. 1) starts its forward movement which rotates the pinion 57 (Fig. 2) in the direction indicated by the arrow. Referring now to Figs. 1a to 1f, the shoe starts its movement from the position shown in Fig. 1a with the foxing-applying tool 31 pressing the leading end of the foxing strip into engagement with the foxing area of the shoe at about the heel-breast line, the shoe being in the position shown in plan and in elevation in that figure. The shoe swings through 180° counterclockwise to the position shown in Fig. 1b where the first portion of the foxing which has been applied is indicated at 300. The shoe then moves to the left and presently is rocked up on its toe portion (Fig. 1c). It then swings through 180° counterclockwise about its toe end until it reaches the position shown in Fig. 1d, this being the same position shown in Fig. 5. It then moves to the left and passes through the position shown in Fig. 1e, which is the same position shown in Fig. 6 in which the shoe has been rocked back into its initial position. After the shoe has been moved to the left until the foxing-applying tool 31 is located at about the heel-breast line, it swings through 180° clockwise about its heel end into the position shown in Fig. 1f. This is the end of the forward movement of the jack, the foxing having been laid all around the shoe and overlapped around the heel end. The foxing-applying tool is now withdrawn from the shoe, and the direction of rotation of the upright shaft 71 (Fig. 1) is reversed to impart reverse movement to the jack. This reverse movement is a clockwise rotation through 180° and returns the shoe to the position shown in Fig. 1a whereupon the movement ceases, and the push rod 73 (Fig. 1) is pushed down to unlock the shoe. Referring to Fig. 6, this unlocking is accomplished when the push rod 73 (not shown in that figure) pushes down the link 209, said link pushing down the rod 201 and causing the rod to push down the link 157 thereby moving the bar 117 to the left. This relieves the pressure of the heel end of the shoe against the abutment 103 and swings the last-pin 111 to free the teeth 113 from engagement with the last-pin hole.

By providing an abutment 103 which is always in the same position when the machine is at rest and occupies a fixed position so far as the shoe-holding means is concerned, and by causing the shoe to be clamped between this relatively fixed abutment and the movable last-pin 111, the rear ends of all shoes operated upon are held in the same position initially, and subsequently move through the same path, a construction which greatly facilitates the accuracy with which the foxing may be laid. It should be noted that the clamping means, which is suspended from the base of the jack in the manner described, engages the upper portion of the lasted shoe in such manner as to leave an unobstructed space about its lower portion and permits the shoe to be presented to the clamping means and the toe-rest by a simple upward movement. It should also be noted that although the machine is provided with a foxing-laying tool which will be described in detail below, the structure thus far described is capable of use with other tools or devices for operating upon or with respect to the lower portion of a shoe.

*The foxing-applying mechanism*

The foxing-applying tool, as has been stated, is mounted for swinging movement toward and from the shoe, for movement heightwise of the shoe and for rocking movement in a plane substantially perpendicular to the longitudinal axis of the shoe so as to follow the contour of the foxing area as the shoe is moved past it, the mounting of the tool being similar in many respects to the mounting of the cement-applying tool of my prior application. The tool of the present invention is a combined foxing-applying and foxing-indenting tool comprising (Fig. 18) a deformable rubber roll fast to a spindle, there being above the roll and also fast to the spindle a rigid indenting wheel 31'. Thus, in the operation of the machine, the wheel indents the upper edge of the foxing, and the rubber roll is deformed by being pressed against the shoe; and that portion of its periphery which is at any given moment operative assumes a contour corresponding to the contour of the foxing area of the shoe at the locality being operated upon. Referring first to Figs. 9 and 10, the foxing-applying and indenting tool 31 hereinafter referred to for convenience as the foxing-applying tool is shown as occupying one of its positions in which it is applying foxing to a shoe, a portion of the shoe being indicated in dot-and-dash lines in Fig. 10. The tool has been swung toward the observer, as viewed in this figure, to bring it into contact with the shoe and will be swung away from the observer to withdraw it from the shoe at the end of the foxing-applying operation. As shown, it is held in position to press the foxing against the foxing area of the shoe by mechanism including a tension spring later to be described, but is free to move widthwise of the shoe in opposition to the force of that spring. The bottom of the shoe is in contact with the bottom-rest 32; and this rest, with which the tool moves in unison heightwise of the shoe, is yieldingly held against the bottom of the shoe by mechanism including certain springs also to be described later. The tool is also capable of rocking movement in a path the plane of which is substantially normal to the longitudinal axis of the shoe independently of the bottom-rest and is acted upon by mechanism including a third spring which permits it to assume various angular positions.

In the operation of the machine a portion of a strip of foxing is always between the operative face of the foxing-applying tool 31 and the shoe and is being pressed by the tool against the shoe. In order, however, to promote brevity in the following description of the mounting and movements of the foxing-applying tool, mention of the foxing will in most cases be omitted and the tool described as though it pressed directly against the shoe.

The foxing-applying tool 31, with its narrow indenting wheel 31', is carried at the outer end of a hollow curved tool-carrying arm 301, the inner end of which is rotatably mounted in a suitable bearing in the hub portion of a work arm 303. Referring to Fig. 13, the work-arm 303 is U-shaped in cross-section, and between the arms of the U is a web 305 having a cylindrical recess to receive a ball bearing 307 which is held in the recess by a thin ring 308 fastened to the web. Mounted for rotary movement in the ball bearing is one end of a sleeve 311 held from longitudinal movement by a flange on the sleeve and a nut 309 threaded on the end of the sleeve. Over the projecting portion of the sleeve the inner split end of the tool-carrying arm 301 fits and is clamped to the sleeve by a pinch screw 313. The axis of rotation of the sleeve 311, and consequently of the tool-carrying arm 301, intersects (Fig. 10) the upper edge of the indenting wheel 31' at the locality in which said edge engages the foxing. This indenting wheel, during the operation of the machine, runs along the upper edge of the foxing and, consequently, the rocking movement of the foxing-applying tool in a path the plane of which is transverse to the longitudinal axis of the shoe takes place about the upper edge of the foxing. Formed on the periphery of the tool-carrying arm 301 are two flanges 315 (Figs. 9 and 10) to provide a groove in which runs a small cable 316 one end of which is fastened to the tool-carrying arm 301 and the other end of which passes around a small pulley 318 carried by the work-arm 303 and is fast to one end of a tension spring 320 the other end of which is fastened to the work-arm. By this mechanism the tool-carrying arm 301 is urged at all times to rock about its horizontal axis which, it will be recalled, passes through the shoe-contacting point on the upper edge of the small indenting wheel 31'. This cable 316 tends always to rock the foxing-applying tool in the direction indicated by the arrow in Fig. 17. This figure shows the tool in full lines in one of the various angular positions it occupies during the laying of the foxing on a shoe 100 held by the moving jack, and in dotted lines shows the tool in the angular position it always occupies when it is first swung widthwise of the shoe into contact with the shoe. Fig. 16 shows the attachment of one end of the cable 316 to a pin 322 carried by the tool-carrying arm 301. In this figure the parts are in positions corresponding to the full-line position of the foxing-applying tool in Fig. 17, at which time the yielding pull of the cable 316 has rotated the tool 31 into the position shown.

It has been stated that, when the foxing-applying tool 31 is first moved into contact with a shoe, it is always in the angular position shown in dotted lines in Fig. 17 with its indenting wheel only in operative position. To permit the tool to be moved into this angular position and held there for a time, the tool-carrying arm 301 (Fig. 16) has a lug 324 to which is fastened a small rod 326 having rotatably mounted thereon a roll 328 which lies in the path of a rotatable finger 330, to be described later. This finger is rotated clockwise, as viewed in Fig. 16 in a manner to be described later, when the tool-carrying arm 301 is swung away from the shoe at the end of a foxing-applying operation, to move the roll 328 into a position indicated by the dotted-line position of that roll in Fig. 16 and to hold the roll in that position until the foxing-applying tool 31 has been moved back into contact with the next shoe, whereupon the finger 330 is swung back into the position shown so as to permit the tool 31 to be swung clockwise (Fig. 17) so as to press the foxing against the foxing area of the shoe. With this construction, the indenting wheel first sticks the upper edge of the leading end of the foxing to the shoe, and then the roll swings to stick the body portion of the leading end of the foxing to the shoe. The leading end of the foxing is thus accurately located on the foxing area and pressed smoothly into place before the shoe starts its forward movement.

The work-arm 303 (Figs. 9 and 10), with respect to which the tool-carrying arm 301 is capable of rocking movement in the manner which has been described, is mounted for swinging movement up and down—that is, heightwise of the shoe—and for swinging movement toward and from the shoe—that is, widthwise of the shoe. To permit the swinging movement heightwise of the shoe the U-shaped hub of the work-arm 303 (Fig. 11) is mounted for swinging movement about alined trunnions 317 which are received in ball bearings 319 carried by the hub of the work-arm, said trunnions being integral with and projecting from cylindrical blocks 321 which are received in bores formed in opposite walls of a boxlike carrier 323 having an open side through which the work-arm 303 projects. The cylindrical blocks 321 have integral with their outer ends circular plates which are fastened to the carrier 323 by screws 325. Tension springs 327 (Figs. 9 and 10), fastened at one of their ends to a pin 329 in the tail of the work-arm 303 and at their other ends to a pin 331 rigid with the carrier 323, tend at all times to swing the work-arm, and with it the tool-carrying arm 301, upwardly as viewed in Fig. 10 so as to hold the bottom-rest 32 always against the bottom of the shoe. The springs also permit the work-arm to be swung down by pressure of the bottom of the shoe against the bottom-rest. The carrier 323 (Fig. 14) is rigidly fastened by screws to a flange 333' integral with the upper end of a shaft 333 rotatably mounted in suitable bearings in the casting B, said shaft having at its lower end (Fig. 10) a split collar 335 adjustably fastened to the shaft by a pinch screw 337. A long tension spring 337', fast at one end to an arm 336 (Fig. 11) on the collar and at the other end to the casting B, tends at all times to rotate the shaft 333 in a direction to swing the work-arm 303 and the tool-carrying arm 301 toward the shoe (toward the observer as viewed in Fig. 10). The spring 337' causes the foxing-applying tool to exert a substantially uniform pressure upon the foxing as it is being laid; and, since the foxing area of the shoe travels past the tool at a substantially uniform linear velocity, substantially the same pressure for the same length of time is exerted upon the foxing throughout the foxing-laying operation. The shaft 333 (Fig. 10) is rotatable in two ball bearings 338 located respectively near the bottom and near the top of the shaft, both bearings being mounted in a sleeve 339 which is made in two parts detachably connected by a tongue-and-groove connection as shown in Fig. 14. The sleeve 339 has at its top a head 339' to receive the upper ball bearing 338 and has a lug through which is threaded a stop screw 341 one end of which is adapted to contact at times (when the arms 303, 301 are in their withdrawn, inoperative positions) with a stop 343 pivoted at 345 to a block 346 having integral with it a pin which is driven into the under side of the carrier 323. The flange 333' at the upper end of the shaft 333 and the collar 335 (Fig. 10) at the bottom of the shaft hold the shaft from endwise movement and the bearings 338 in place.

In order to steady the tool-carrying arm 301 in its rotary movement about its horizontal axis, which as has been explained is tangent to the periphery of the indenting wheel 31' (Fig. 10), a construction like that which steadies the tool-carrying arm of the machine of my prior application is provided. This mechanism comprises rolls, one of which is shown at 346', carried at the outer end of the tool-carrying arm 301 and running in a segmental cam track formed in a segmental member 347 (see also Fig. 1) which is fastened by bolts 349 to an upstanding flange integral with the outer end of the work-arm 303, the center of curvature of the cam track lying in the axis of rotation of the arm 301. The bottom-rest 32 (Figs. 9 and 10), which comprises a flat plate and a narrow roller along one edge thereof, is mounted on a segmental carrier 351 held in place for rocking movement about the center of curvature of the segment by four grooved rolls 353 mounted in a bracket 355 adjustably fastened to the work-arm 303 by a cap screw 357 which passes through a slot in the bracket and is threaded into the arm. The segmental carrier 351 is free to rock in either direction about its center of curvature, but this movement is limited by two walls 359 of a recess in its lower edge, either of which may contact with the head of the screw 357. The purpose of this mounting is to permit the bottom-rest to be held firmly against the bottom of a shoe and to rock as may be necessary.

As has been stated, the parts of the machine, as shown in Figs. 9 and 10, are in one of their positions in which the shoe is being operated upon. Prior to their reaching these positions the work-arm 303, together with the tool-carrying arm 301 was swung, toward the observer as viewed in Fig. 10, to cause the bottom-rest 32 to contact with the bottom of the shoe and the foxing-applying tool 31 to press the leading end of a strip of foxing into contact with the shoe, by a half-revolution of a gear 361. This gear is similar to the corresponding gear in the machine of my prior application and has imparted to it intermittently, by the same mechanism as that of the machine of my prior application, two half-revolutions. Part of this mechanism is the elongated gear 362 shown in Fig. 1. The gear 361 has cut in its lower face a cam track to receive a roll carried at one end of a lever 363, the other end of which is integral with the lower section of the two-part sleeve 339. When the parts come to rest after the work-arm 303 has been swung out into inoperative position (away from the observer as viewed in Fig. 10), the stop screw 341 is in contact with the stop 343 (see also Fig. 14), and the work-arm 303 is held out against the force of the tension spring 337'. After the shoe with the foxing laid upon it has been removed from the jack and a new shoe presented to the jack, the operator depresses a treadle, as has been described above, to start the machine. The shoe is automatically clamped to the jack and the first half-revolution is imparted to the gear 361. This turns the sleeve 339 counterclockwise, as viewed in Fig. 9, and thus tends to move the stop screw 341 away from the stop 343. However, the stop is held in contact with this screw by the spring 337' (Fig. 10) and thus follows the screw 341 until the foxing-applying tool strikes the shoe. The sleeve 339 continues its rotation somewhat farther so that the stop screw moves away from the stop 343 until it reaches some such position as shown in Figs. 10 and 14. The foxing-applying tool 31 is now held in contact with the foxing area of the shoe by the spring 337' and can move widthwise of the shoe since the spring 337' permits such movement. The shoe is now moved by the jack in the manner which has been described above to present its foxing area progressively to the tool 31 until the foxing-laying operation is completed, whereupon the arms 303, 301 are swung away from the shoe by a second half-revolution of the gear 361. This second half-revolution rotates the sleeve 339 clockwise as viewed in Fig. 9, and presently the screw 341 encounters the stop 343, swings the carrier 323 until the tool 31 and the bottom-rest 32 are in inoperative position remote from the shoe, and holds the carrier and the arms in these positions as the machine comes to rest. The purpose of pivoting the stop 343 to the block 346 (Figs. 14 and 15) is to permit the stop to be swung out of the way when desired. For example, the machine comes to rest with the arms 301, 303 swung out away from the shoe; but it is desirable to have these arms swung in to some extent when the leading end of a new strip of foxing is being led from a reel around certain guide rolls (all of which will be described later) and the foxing-applying roll after a previous strip has all been used. At such times the operator pushes back the arm 303 a little farther to free the stop 343 from the end of the screw 341, swings the stop into inoperative position about its pivot 345 and releases the arm, whereupon the arm swings in somewhat. After the end of the new strip of foxing has been put in place, the arm 303 is pulled out, the stop 343 swung back into operative position, and the arm released.

It has been explained above (Figs. 16 and 17) that, after the arms 301, 303 have been swung away from the shoe at the end of a foxing-applying operation and before they have been swung back again to cause the foxing-applying tool 31 and the bottom-rest 32 to engage another shoe, the foxing-applying tool is swung into the dotted-line angular position shown in Fig. 17 and held in that position until the indenting wheel 31' forces the upper edge of the foxing against the shoe to stick said upper edge to the upper edge of the foxing area, and that this swinging or rocking of the foxing-applying tool is brought about by rocking the finger 330 clockwise to the desired extent to engage the small roll 328 and move it into its dotted-line position. As soon as the indenting wheel 31' has pressed the upper edge of the foxing against the shoe, as shown in dotted lines in Fig. 17, the finger 330 is swung back into the position shown, and the tool-carrying arm 301 is rotated by the yielding pull of the cable 316 in the opposite direction to swing the foxing-applying tool 31 in the direction indicated by the arrow in Fig. 17 into the full-line position so as to cause said tool to press the leading end of the foxing smoothly into place from the top to the bottom of the foxing area. Thereafter, during the laying of the foxing, the tool may rock in either direction. The hub of the finger 330 is fast to one end of a small rockshaft 365 mounted in the carrier 323, to the other end of which is fastened the hub of a small arm 367 which lies in the path of the upper end of a push rod 369. This push rod (Fig. 10) is slidably mounted in a bore in the shaft 333 to the upper end of which the carrier 323 is fastened. Its lower end is engaged by one arm of a bell-crank lever 371 pivoted at 373 to the casting B, the other arm of which is connected by a link 375 with one arm of a second bell-crank lever 377 pivoted at 379 to the casting B, the other arm of said bell-crank lever 377 carrying a roll 381 which runs on a track formed on one side of the gear 361. The shape of the cam and the construction of the levers and link are such that during the first half-revolution of the gear 361, which acts to swing the foxing-applying tool into contact with a newly-jacked shoe, the foxing-applying tool is swung into the dotted-line position shown in Fig. 17, held in such position until it presses the upper edge of the foxing against the shoe near the end of the first half-revolution, and then is released and permitted to assume its full-line position.

It may be explained here that, when the work-arm 303 is swung away from the shoe (away from the observer as viewed in Fig. 10) at the end of a foxing-applying operation, it is also swung down against the force of the springs 327 and held in lowered position until a new shoe has been presented to the jack and the treadle of the machine has been depressed, whereupon it swings toward the shoe, and the springs 327 are permitted to swing it up. Thus when the bottom-rest 32 approaches a newly-jacked shoe, it approaches the shoe diagonally from below until it is stopped by contact with the bottom of the shoe. The mechanism for swinging the work-arm 303 down when the carrier 323 is rotated about the axis of the shaft 333 to withdraw the shoe and for permitting the springs 327 to swing the arm up when the carrier is rotated in the opposite direction is substantially the same as the mechanism in the machine of my prior application. This mechanism comprises a small abutment 383 on the under side of the tail of the work-arm 303 which is first engaged and then released by the head 385 of an adjustable screw threaded into a plunger slidably mounted in a wall of the carrier 323. The plunger, at its lower end is forked to receive a roll 389 which, when the carrier 323 is rotated to withdraw the tool and bottom-rest from the shoe, runs up the inclined face and over upon the flat top of a stationary cam 391 which is adjustably fastened to the casting B by a thumb-screw 393. The inclined face and flat top of the cam 391 are clearly shown in Fig. 11. It will be noted that in that figure as in Fig. 10 the roll 389 is entirely out of contact with the cam since the parts of the machine are in the positions which they occupy while the shoe is being operated upon; and during this time the work-arm 303 is free to swing in either direction about the alined axes of the trunnions 317 (Fig. 11).

*The foxing-supplying and severing mechanism*

The foxing is supplied to the machine in the form of a long strip of indeterminate length together with an intercoiled separator strip. Before the machine is ready to operate, the leading end of the foxing strip is led by hand over certain guide-rolls to the periphery of the foxing-applying tool or roll 31; and the leading end of the separator strip is led over certain guide-rolls and fastened to the hub of a winding-up reel. After the machine has thus been made ready, it is operated in the manner which has been described above, the foxing strip being automatically severed at the proper time near the end of the foxing-laying operation on each shoe. The foxing is applied progressively to the shoe entirely by the rotation of the foxing-applying roll which is idly mounted and is rotated by the moving shoe, against the foxing area of which it is pressing the foxing.

Referring to Fig. 18, the foxing-applying roll 31 comprises a body of rubber fastened to a small spindle 401 rotatably mounted in ball bearings 403 carried by the arm 301, the foxing strip 200 being led over rolls 405, 407, and past a roll 410 to the foxing-applying roll, these three rolls last-mentioned all being carried, as is the foxing-applying roll, by the arm 301. The guide-roll 407 is rotatable on a headed rod 409 held rigid with the arm 301 by a nut 411 and has a flange at its upper end to engage the upper edge of the foxing strip 200. The guide-roll 405 is rotatable on the reduced upper portion of a rod 413 adjustably held in a bore in a lug on the arm 301 by a set screw 415, said roll having at its lower end a flange to engage the lower edge of the foxing strip, the roll 405 being adjustable into a position in which the distance between the flange of that roll and the flange of the roll 407 is equal to the width of the foxing. The small roll 410 is rotatable on a pin 417 carried by the arm 301, its purpose being to cooperate with a gripping and feeding member which first grips the foxing strip while it is being severed and then feeds forward the leading end of said strip a short distance.

Before describing the whole mechanism in detail, a general description of what takes place near the end of the foxing-applying operation will be briefly set forth. In Fig. 20, the heel end of a shoe 100 is shown in the position which it occupies near the end of the foxing-laying operation. The foxing strip has been laid, beginning at the point marked by the plain arrow, all around the foxing area of the shoe, has been overlapped somewhat around the heel of the shoe and will continue to be overlapped to the point indicated by the feathered arrow. When the shoe is about in the position shown, the foxing strip is severed by a knife 419 carried by the outer end of a stem 420 which is swung quickly down into the cutting position shown in Fig. 24, then back into its rear position and finally forward into the mid-position shown in Fig. 20 which is its position of rest. When the knife is swung to its cutting position (Fig. 24) a combined gripping and feeding member 421, hereinafter referred to as a gripper, is swung into the position there shown to grip the foxing strip by pressing it against the small roll 410. The severing of the strip takes place instantly; and the shoe 100 continues its swinging movement, as indicated by the arrow in Fig. 20, until the free end of the foxing which is attached to the shoe is overlapped upon part of the foxing already in place on the shoe to the point marked by the feathered arrow, whereupon the foxing-applying tool is withdrawn from the shoe. During this laying of the last end of the foxing on the shoe, the parts of the machine shown in Fig. 24 move rapidly through the positions shown in Figs. 25, 26, and 27 to feed the leading end of the foxing into the position shown in Figs. 26 and 27 ready for application to another shoe and then back again into the position shown in Fig. 20, where they come to rest. In Fig. 24, the gripper 421 has been swung clockwise to press the leading end of the foxing strip against the roll 410 to hold the foxing strip during the severing operation. In Fig. 25, the gripper 421 has been swung bodily a short distance to clamp the severed end of the foxing strip against the foxing-applying roll. In Fig. 26, it has been swung bodily considerably farther to feed the leading end of the foxing strip into the desired position. In Fig. 27, it has been swung still farther bodily for a purpose later to be described. It is then swung back into the position shown in Fig. 20.

Referring again to Fig. 18, there is rotatably mounted in ball bearings in the arm 301, directly below and in line with the spindle 401 of the foxing-applying roll, a spindle 423 to which is fastened by a pinch screw 425 (Fig. 21) the split hub of an arm 427 having rotatably mounted at its outer end a spindle 429 provided at its upper end with a head 431 with which the gripper 421 is integral and from which the gripper projects upwardly. A comparatively strong torsion spring 433 fast at one end to the head 431 and at the other end to the arm 427 tends at all times to rotate the gripper 431 in a clockwise direction as viewed in Fig. 24. The gripper, however, until the time arrives for severing the strip 280, is held in the angular position shown in Fig. 20 so that the foxing strip may pass freely through the space between it and the small roll 410. To this end the lower end of the spindle 429 has fast to it a small block 435 (Fig. 22) having a flat face 435' which is normally engaged by the end of a small cam 437 fast to the lower end of a small spindle 439, said spindle being urged angularly in the direction indicated by the arrow in that figure by a weak torsion spring 441 (Fig. 18) as far as is permitted by contact of the tail 437' (Fig. 22) of the cam 437 with a pin 443 carried by the arm 427. This cam 437, in the position of parts shown in Figs. 20 and 22, thus holds the gripper 421 in inoperative position. The cam 437 is swung counterclockwise, as viewed in Fig. 22, in opposition to the force of the weak torsion spring 441 by a small swinging arm 445 the outer end of which engages the end of a finger 447 which is located below the cam 437 and is integral therewith; and, when this occurs, the gripper 421 is rotated by the torsion spring 433 (Fig. 18) into the position shown in Fig. 24. The gripper, it will be recalled, is integral with its stem 429 and is being urged at all times by the torsion spring 433 (Fig. 18) to rotate clockwise as viewed in Fig. 24 about the axis of its stem. The small cam 437 is swung by the arm 445 into the position shown in Fig. 22a; and this change of position permits the comparatively strong torsion spring 433 to swing the block 435 into the position shown in Fig. 22a. Since this block is rigid with the spindle 429 of the gripper, the gripper is swung angularly about the axis of its spindle into the position shown in Fig. 24. Due to the fact that the torsion spring which acts upon the spindle of the gripper is much stronger than the torsion spring which acts upon the spindle of the small cam 437, the parts shown in Fig. 22a will remain in their relative positions there shown until force is applied to the tail of the small cam 437 to force it back into contact with the stop-pin 443. These parts preserve their relative positions shown in Fig. 22a while the arm 427, by which they are all carried, is swung through the positions shown in Figs. 25 and 26. The small arm 445 has a hollow split hub which is fastened by a pinch screw 448 to a sleeve 449, said sleeve being rigid with the hub of the stem of the knife, and consequently when the knife is swung into the position shown in Fig. 24 to sever the foxing, the small arm 445 swings the small cam 437 counterclockwise as viewed in Fig. 22 to permit the gripper to grip the strip previous to the severing operation. The knife 419 (Fig. 19), which is segmental in cross-section, is fast to a yoke which constitutes its stem 420. A block 451 having a segmental face in contact with the knife is mounted on the arm 301 and is kept hot by an electric heating unit 453 (Fig. 20). The hubs of the arms of the yoke 420 (Figs. 18, 19) are rotatably mounted on the rod 409, and the lower hub has a tongue 420' which fits into a socket in one end of the sleeve 449. Integral with the hub of one arm of the yoke is a short arm 455 to the outer end of which is pivoted one end of a link 457, said link being reciprocated at proper times by mechanism, later to be described, to swing the knife and with it the sleeve 449 about the axis of the rod 409. By maintaining the knife hot, the severing operation is facilitated, probably because it then becomes a combined cutting and searing operation.

Referring to Figs. 20 and 24 to 27, it will be explained here that the knife stem 420 is swung from a normal mid-position (Fig. 20) forward into the position shown in Fig. 24, then back to its rearward position, and then forward again into its mid-position, and that the swinging movements of the knife stem cause the gripper 421 and certain other parts first to move through the positions shown in Figs. 24, 25, and 26 to sever the foxing strip and to feed the leading end of said strip into proper position on the foxing-applying roll 31, and then to move through the position of Fig. 27 back into their normal positions of rest as shown in Figs. 20 and 21. Referring to Fig. 20a, the line M represents the mid-position of the knife, the line F the forward severing position, and the line R the rear position. During the swinging of the knife from the position M to the position F, the foxing strip is gripped between the side of the gripper 421 and the small roll 410 and, while so gripped, is severed by the knife (Fig. 24). During the swinging of the knife from the position F to the position M, no movement of the gripper 421 takes place.

During the swinging of the knife from the position M to the position R the arm 427 (Fig. 18), in which the spindle of the gripper is mounted, swings about the spindle 423 which is alined with the spindle 401 of the foxing-applying roll 31. This movement swings the gripper 421 bodily about the axis of the spindle 401 of the foxing-applying roll through the positions shown in Figs. 25 and 26 into the position shown in Fig. 27. In Fig. 25, the knife has just left position M and is moving toward position R, this slight movement having caused the teeth of the gripper 421 to engage the end of the severed foxing strip and to press said end against the foxing-applying roll. The strip has been severed and the gripper is now in position to feed the leading end of the strip, and in doing so to rotate the foxing-applying roll a short distance. As the gripper swings bodily from the position shown in Fig. 25 into the position shown in Fig. 26, it pushes aside a yielding presser 460 so as to pass between this presser and the foxing-applying roll 31. This presser depends integrally from the outer end of a stem 460' the inner end of which is fast to a small rockshaft 462 (Fig. 20) rotatably mounted in the arm 301, the presser being urged at all times toward the foxing-applying roll by a torsion spring 464 (Fig. 10) coiled about the rockshaft and fastened at one end to the rockshaft and at the other to the arm 301. When the parts are in the positions shown in Fig. 26, the gripper has fed the end of the foxing strip past the presser 460 and thereby turned the foxing-applying roll into the position shown in which the end of the strip is in position to contact with the foxing area of the next shoe to be operated upon. In that figure, the tail 437' of the small cam 437 has just moved into contact with a small abutment pin 459 which is carried by the arm 301. In this figure, as in Fig. 25, the flat-faced block 435 and the cam 437 are in the relative positions shown in Fig. 22a. In Fig. 27, the gripper has been swung bodily still farther, with the result that the small cam 437 has been turned about its axis 439 to turn the flat-faced block 435 and to swing the gripper 421 out into inoperative position. In this figure, the cam 437 and the flat-faced block 435 with which it co-operates are in the same relative positions in which they appear in Fig. 22. During the swinging of the knife from the position R to the position M, where at this time it comes to rest, the arm 427 (Fig. 18) is swung back, and the parts of the foxing-severing and feeding mechanism are again in their positions of rest as shown in Fig. 20. When the parts swing back from the positions shown in Fig. 27 to their initial positions shown in Fig. 20, the gripper 421, which reached the position shown in Fig. 27 by passing between the presser 460 and the foxing-applying roll 31, passes outside of the presser.

The arm 427 (Fig. 18) is swung first in one direction and then in the other about the axis of the spindle 423 to cause the movements of the gripper 421 which have just been described, by the rotation first in one direction and then in the other of the sleeve 449 which is rigid with the hubs of the yoke 420 by which the knife is carried. The sleeve 449 has integral with one end of it an arm 461 (see also Fig. 23) having formed at its outer end a short segmental rack 463 which meshes at times (when the arm is swung up as viewed in Fig. 23) with a small gear 465 fast to the lower portion of the spindle 423 to the middle portion of which the gripper-carrying arm 427 is also fast. Fastened by screws to one face of the rack-carrying arm 461 is a plate having at its outer end a plain-faced segment 467 which has sliding contact with the suitably-curved edge of a block 469 which is fast to the spindle 423. Thus when the knife is swung from mid-position (Fig. 20) to forward position (Fig. 24) and back again, no rotation is imparted to the gripper-carrying arm 427 because the segmental rack 463 is merely swung first away from the gear 465 and then back again into the position shown in Fig. 23. When, however, the knife swings from mid-position to rear position, the segmental rack 463 turns the gear 465, clockwise as viewed in Fig. 23, to swing the arm 427 (Fig. 18) to carry the gripper 421 through the positions shown in Figs. 25 and 26 to that shown in Fig. 27. And when the knife is swung from its rear position to its mid-position where it comes to rest, the gripper 421 is carried back to its initial position.

It has been explained that the foxing strip is yieldingly held against the foxing-applying roll by the pivoted presser 460. In order to maintain the upper edge of the foxing strip flush with the top of the indenting wheel 31' of the foxing-applying roll, an edge guide 471 (Fig. 20) having an edge of arcuate outline is located above the foxing-applying roll, the stem of this edge guide being pivoted about the small rockshaft 462 to which the stem of the presser 460 is fast. A tension spring 473, fast at one end to a hook carried by the stem of the guide and at the other end to a hook carried by the arm 301, normally holds the operative portion of the edge guide out somewhat beyond the adjacent portion of the foxing-applying roll. The edge guide is pushed into the position shown in Figs. 18 and 20 by contact with the shoe just above the foxing area. In order to hold the upper edge of the moving foxing strip against the edge guide 471, the operative face of the presser 460 may be provided with ribs or ridges which extend across said face diagonally upward considered in the direction of feed movement of the foxing strip.

It has been explained above that the knife 419 (Fig. 20) is swung back and forth at the proper times by the link 457 one end of which is pivoted to an arm 455 projecting from the hub of the stem or yoke 420 which carries the knife. The link 457 (Figs. 9, 10, and 13) is connected at its inner end by means of a suitable joint 475 to the outer end of a rod 483. The inner end of this rod carries a spool 485 into the groove of which project from opposite sides of the spool two small rolls 487 carried at the ends of a small yoke 489 (Fig. 11). The yoke 489 forms one arm of a bell-crank lever, the other arm of which is shown at 491 (Fig. 10), the hub of this bell-crank lever being fast to a small rockshaft 493. The arm 491 has a slot 495 to receive a pin carried by the upper end of a link 497, the lower end of this link being pivoted to the outer end of an arm 499, the inner end of which is pivoted at 502 to the carrier 323. With this construction it will be evident that swinging the arm 499 about its pivot 502 will act, through the mechanism which has just been described, to swing the knife back and forth. The arm 499 is swung at the proper times by an actuator 503 slidably and pivotally connected to the casting B and having in its upper end a horizontal slot 505 (Fig. 11a) into which projects a pin 507 carried by the arm 499. Consequently, when the actuator is moved up and down the arm 499 is swung to operate the knife. Inasmuch as the carrier 323, upon which the arm 499 is mounted, is turned at times about the axis of the shaft 333 at the upper end of which it is carried and the sliding actuator 503 is carried by the casting B which is stationary, the arm 499 has a bend at the point at which the pin 507 is mounted so as to permit swinging of the carrier 323 with respect to the casting B without causing binding of the arm 499 and the actuator 503. The lower end of the actuator (Fig. 10) is pivoted to one end of a lever 509 which is pivoted near its middle about a pivot 379 and carries at its other end a roll 511 running in a cam track formed in a cam 513 which is cut in the hub of the gear 361. With this construction the actuator will be rocked to some extent when it is moved up and down by the lever 509. In order to guide the actuator in its movement, it is provided with a slot 515 (Fig. 12a) to receive the square stem of a guide block 517 pivoted on the stem of a screw 519, the reduced end of which is threaded into the casting B.

Referring now to Fig. 12, the manner in which the foxing strip is handled prior to being applied to the shoe by the foxing-applying roll will be described. The foxing strip 200 is intercoiled with a separator strip 300 and mounted upon a supply reel 543 the hub of which is rotatably mounted on a stud (not shown) projecting from the side of the frame of the machine. The leading ends of the two strips are separated, the end of the foxing strip 200 being led over various rolls later to be described, and the end of the separator strip being led around a roll 545 and down around the hub of a winding-up reel 547 rotated by a chain 549 which passes around a sprocket on the hub of the winding-up reel and around a driving sprocket 551, a spring-pressed chain-tightener 553 of usual construction being provided. This sprocket is driven from the driving shaft of the machine, which is like the driving shaft of my prior application, and is rotated first in one direction and then in the other to move the jack first in a forward direction while the foxing is being applied and then in the reverse direction to return the jack to initial position. Inasmuch as no foxing is being applied to the shoe during the reverse movement of the jack, the sprocket 551 should not be rotated at this time. It is consequently connected with the driving shaft of the machine by a one-way clutch (not shown) which rotates the sprocket 551 only when the jack is moving forward and foxing is being applied to the shoe. When the winding-up reel 547 is rotated, a portion of the separator strip 300 is wound upon it, and at the same time a portion of the foxing is unreeled from the supply reel 543. The foxing strip 200 passes over the roll 545 and over a roll 555, these two rolls carrying gears which mesh with a small gear 546 which is located between them, the roll 545 being driven by the separator strip, and the roll 555 being driven through the small gear 546 by the roll 545. The foxing strip then passes around a roll 556, makes a quarter-turn, passes over a guide roll 557, makes another quarter-turn (Fig. 9) and passes, as has been described, around the rolls 405, 407 and past the small roll 410 to the foxing-applying roll 31.

The foxing strip is a thin, flimsy strip of unvulcanized rubber which will be distorted or broken if any considerable tension is exerted upon it. Consequently, provision should be made for avoiding such tension of the foxing strip as it is pulled along by the foxing-applying roll and applied to the shoe. To this end, mechanism is provided for intermittently providing small amounts of slack in the foxing strip at a point between the supply reel and the foxing-applying roll, said mechanism being operated by the pull of the foxing-applying roll on the strip as it applies foxing to the shoe, the mechanism being so sensitive that the pull on the foxing strip which is required to cause the mechanism to operate is so slight as to have no injurious effect on the foxing strip. The roll 556 (Fig. 12) is mounted at the outer end of a long arm 559 the hub of which is fast to a small rockshaft 561 carried by the frame of the machine. An arm 563, the hub of which is also fast to this rockshaft, is pivoted at its upper end to one end of a link 565, the other end of which is pivoted to the lower end of a lever 567, said lever being pivoted at 569 to the frame and having at its upper end a shifting fork provided with rolls which engage in the usual manner a groove in the hub of a friction brake disk 571. The arms 559, 563, the link 565 and the shifting lever 567 are all of light-weight construction; and the downward pull of the arm 559 due to gravity is almost but not quite balanced by a tension spring 573 attached at one end to the frame of the machine and at the other to the arm 563. The arm 559, however, if unsupported, will swing down by gravity and slide the brake disk 571 into operative position. This brake disk, which is loose on a small horizontal shaft 575 rotatably mounted in bearings in the frame, is adapted to cooperate with a second brake disk 577 fast to one end of the shaft; and the shaft has fast to its inner end a bevel gear 579 which meshes with a ring-gear 581 rigid with the supply reel 543. If now the loop of foxing which passes around the roll 556 is exerting no force to hold up the arm 559, the brake mechanism consisting of the two disks 571, 577 will be operative and will tend to hold the supply reel 543 from rotation. Whether they do or do not so hold it depends, of course, upon the holding power of the brake mechanism compared to the force exerted by the pull of the separator strip 300 which acts to rotate the supply reel. The force of this pull is made just sufficient to rotate the supply reel 543 when the brake disk 571 is in its inoperative position and insufficient to rotate the supply reel when the brake disk 571 has been moved into operative position by the swinging down of the arm 559. The force of the pull of the separator strip 300 may be controlled by any suitable mechanism. In the present machine, the shaft of the sprocket 551 is connected with the one-way clutch which drives this sprocket by a friction device comprising two friction disks which are held together by a spring the tension of which may be varied so that the sprocket may be held stationary at any time by the exertion of a pre-determined force. This controlling mechanism has not been shown since it is of a well-known type and any suitable construction may be employed. Thus, when the brake disks 571, 577 are held together, both the supply reel 543 and the winding-up reel 547 are held from rotation. This is the position of parts shown in Fig. 12 in which the force of gravity is holding the arm 559 in its lower position. Presently, however, as the foxing continues to be applied to the shoe, the loop of foxing, which extends from the roll 555 around the roll 556 and over the roll 557, will be shortened. This will swing up the arm 559 and withdraw the friction disk 571 from operative position. Immediately the winding-up reel will start to rotate and, through the separator strip 300, will rotate the supply reel to deliver foxing. This will lengthen the loop of foxing which extends around the roll 556, whereupon the arm 559 will swing down again to apply the brake disk 571 again; and these operations will continue to be repeated as long as the foxing-applying roll is applying foxing to the shoe. The foxing strip, being made of unvulcanized rubber, is so sticky that if two parts of it contact with each other, they will immediately adhere. By the mechanism described above, not only is the foxing strip drawn along and applied to the shoe without exerting at any time upon it sufficient tension to distort it; but at the same time the foxing strip, from the supply reel to the foxing-applying roll, is maintained sufficiently taut at all times so that no part of it can sag into contact with another part.

Although the invention has been set forth as embodied in a particular machine for applying a foxing to a shoe, it should be understood that the invention is not limited in the scope of its application to the particular machine which has been shown and described. Certain subject-matter herein disclosed is also disclosed in my prior application, Serial No. 663,121, referred to above, and in my prior application, Serial No. 590,109, filed February 1, 1932; and all patentable subject-matter common to the present application and to my prior applications is claimed in said prior applications.

Having described my invention, what I claim as new and desire to secure by Letters Patent of the United States is:

1. A machine of the class described having, in combination, a holder for a shoe, a foxing-applying tool, and means for imparting movements of rotation and translation to the shoe holder to cause the foxing area of the shoe to be traversed by the tool.

2. A machine of the class described having, in combination, a holder for a shoe, a foxing-applying tool, and means for imparting movements of rotation and translation to the shoe holder to cause the foxing area of the shoe to be traversed by the tool, said movements of translation taking place always in the same direction.

3. A machine of the class described having, in combination, a holder for a shoe, a foxing-applying tool, and means for imparting movements of rotation and translation to the shoe holder to cause the foxing area of the shoe to be traversed by the tool in such manner that the traverse takes place at a substantially constant velocity.

4. A machine of the class described having, in combination, a holder for a shoe, a foxing-applying tool, an arm by which said tool is carried, yielding means for causing the arm to hold the tool against the shoe, and means for imparting movements of rotation and translation to the shoe holder.

5. A machine for applying a foxing to a shoe having, in combination, a support for a shoe, a foxing-applying tool, means for causing the tool yieldingly to press the foxing against the foxing area of the shoe with a substantially constant force, and means for imparting movements of rotation and translation to the shoe support to cause the foxing area to travel past the tool at a substantially constant linear velocity.

6. A machine for operating upon a shoe part having in combination a holder, an operating tool, means for rotating the holder about a fixed axis and for imparting movement of translation of the holder with respect to said axis, and means for tilting the holder.

7. A machine of the class described having, in combination, a holder for a shoe, a tool for operating upon the shoe in a locality adjacent to the bottom thereof, means for rotating the shoe holder about a fixed axis and for imparting movement of translation to the shoe holder with respect to said axis, and means for tilting the shoe holder about an axis extending widthwise of the shoe.

8. A machine of the class described having, in combination, a holder for a shoe, a foxing-applying tool, and means for imparting movements of rotation and translation to the shoe holder and for causing relative movement between the tool and the shoe holder heightwise of the shoe to cause the foxing area of the shoe to be traversed by the tool.

9. A machine of the class described having, in combination, a holder for a shoe, a foxing-applying tool, and means for imparting movements of rotation and translation to the shoe holder and for tilting the shoe holder to cause the foxing area of the shoe to be traversed by the tool.

10. A machine of the class described having, in combination, a holder for a shoe, a foxing-applying tool, and means for imparting movements of rotation and translation to the shoe holder and for tilting the shoe holder about an axis extending widthwise of the shoe to cause the foxing area of the shoe to be traversed by the tool.

11. A machine for operating upon the lower portion of a lasted shoe having, in combination, an operating tool, a jack, and means for producing relative movement between the jack and the tool to cause a portion of the shoe to be traversed by the tool, said jack including shoe-holding means for engaging the upper portion only of the shoe in such manner as to leave a free space around the lower portion and bottom of the shoe, and means independent of the shoe for moving the holding means during the relative movement between the jack and the shoe to tilt the shoe about an axis extending widthwise of the shoe.

12. A machine for operating upon the lower portion of a lasted shoe having, in combination, an operating tool, a jack, and means for producing relative movement between the jack and the tool to cause a lower portion of the shoe to be traversed by the tool, said jack including shoe-holding means comprising relatively movable clamping members, one of which engages the last, for engaging the upper portion only of the shoe in such manner as to hold the shoe right side up and to leave an unobstructed space about the lower portion of the shoe, and means independent of the shoe for tilting the jack during the relative movement between the tool and the jack.

13. A machine for operating upon the lower portion of a lasted shoe having, in combination, an operating tool, a jack, and means for producing relative movement between the jack and the tool to cause a lower portion of the shoe to be traversed by the tool, said jack including shoe-holding means comprising relatively movable clamping members, one of which engages the last, for engaging the upper portion only of the shoe in such manner as to hold the shoe right side up and to leave an unobstructed space about the lower portion of the shoe, and means acting upon the clamping means independently of the shoe for tilting the shoe and holding the shoe tilted during the traverse of a portion of the shoe by the tool.

14. A machine for operating upon the lower portion of a lasted shoe having, in combination, an operating tool, a jack, and means for producing relative movement between the jack and the tool to cause a lower portion of the shoe to be traversed by the tool, said jack including shoe-holding means comprising relatively movable clamping members, one of which engages the last, for engaging the upper portion only of the shoe in such manner as to hold the shoe right side up and to leave an unobstructed space about the lower portion of the shoe, and means acting upon the clamping means independently of the shoe for tilting the shoe and holding the shoe tilted during the traverse of the toe portion thereof by the tool.

15. A machine for operating upon the lower portion of a lasted shoe having, in combination, an operating tool, a jack, and means for producing relative movement between the jack and the tool to cause the lower portion of the shoe to be traversed by the tool, said jack including depending shoe-holding means for engaging the upper portion only of the shoe constructed and arranged to permit the shoe to be raised into engagement therewith by an upward movement and to be held right-side-up, and means acting upon the holding means independently of the shoe for moving the holding means during the relative movement between the jack and the shoe to tilt the shoe.

16. A machine for operating upon the lower portion of a lasted shoe having, in combination, an operating tool, a jack, and means for producing relative movement between the jack and the tool to cause the lower portion of the shoe to be traversed by the tool, said jack including depending shoe-holding means for engaging the upper portion only of the shoe constructed and arranged to permit the shoe to be raised into engagement therewith by an upward movement and to be held right-side-up, and means acting upon the holding means independently of the shoe for moving the holding means during the relative movement between the jack and the shoe to tilt the shoe about an axis extending widthwise of the shoe.

17. A machine for operating upon the lower portion of a lasted shoe having, in combination, an operating tool, a jack, and means for producing relative movement between the jack and the tool to cause the lower portion of the shoe to be traversed by the tool, said jack including depending shoe-holding means for engaging the upper portion only of the shoe constructed and arranged to permit the shoe to be raised into engagement therewith by an upward movement and to be held right-side-up, and means acting upon the holding means independently of the shoe for moving the holding means during the relative movement between the jack and the shoe to tilt the shoe about an axis extending widthwise of the shoe and to hold it tilted during the traverse of a portion of the shoe by the tool.

18. A machine for operating upon the lower portion of a lasted shoe having, in combination, an operating tool, a jack, and means for producing relative movement between the jack and the tool to cause the lower portion of the shoe to be traversed by the tool, said jack including depending shoe-holding means for engaging the upper portion only of the shoe constructed and arranged to permit the shoe to be raised into engagement therewith by an upward movement and to be held right-side-up, and means acting upon the holding means independently of the shoe for moving the holding means during the relative movement between the jack and the shoe to tilt the shoe about an axis extending widthwise of the shoe and to hold it tilted during the traverse of the toe portion of the shoe by the tool.

19. A machine for operating upon the lower portion of a lasted shoe having, in combination, an operating tool, a jack, and means for moving the jack in a predetermined path to cause the lower portion of the shoe to be traversed by the tool, said jack including depending shoe-holding means constructed and arranged to permit the shoe to be raised into engagement therewith by a simple upward movement and to be held right-side-up, and means acting upon the holding means independently of the shoe for moving the holding means during the movement of the jack to tilt the shoe.

20. A machine for operating upon the lower portion of a lasted shoe having, in combination, an operating tool, a jack, and means for moving the jack in a predetermined path to cause the lower portion of the shoe to be traversed by the tool, said jack including depending shoe-holding means constructed and arranged to permit the shoe to be raised into engagement therewith by a simple upward movement and to be held right-side-up, and means acting upon the holding means independently of the shoe for moving the holding means during the movement of the jack to tilt the shoe about an axis extending widthwise of the shoe.

21. A machine for operating upon the lower portion of a lasted shoe having, in combination, a tool, a depending post, a jack carried by the post for supporting a shoe by engagement with the upper portion only thereof, leaving the lower portion unobstructed, means for moving the jack to cause the lower portion of the shoe to be traversed by the tool, and means for tilting the jack about an axis extending widthwise of the shoe during said traverse.

22. A machine for operating upon the lower portion of a lasted shoe having, in combination, a tool, a depending post, a jack carried by the post for supporting a shoe by engagement with the upper portion thereof, leaving the lower portion unobstructed, means for moving the jack to impart movements of rotation and translation to the shoe to cause its lower portion to be traversed by the tool, and means for tilting the shoe first in one direction and then in another during said traverse.

23. A machine for operating upon the lower portion of a lasted shoe having, in combination, a tool, a jack for supporting a shoe by engagement with the upper portion thereof, depending means for supporting the jack for movement about a downwardly inclined axis, means for moving the jack in a closed path to carry successive parts of the lower portion of the shoe past the tool, and means for moving portions of the shoe heightwise at predetermined points in its path of movement past the tool.

24. A machine for operating upon the lower portion of a lasted shoe having, in combination, a tool, a jack, means for moving the jack to cause the shoe to be traversed by the tool, said jack comprising a base and shoe-holding means suspended from the base for rocking movement with respect thereto, and means acting directly upon the shoe-holding means to rock it and thereby to rock the shoe.

25. A machine for operating upon the lower portion of a lasted shoe having, in combination, a tool, a jack, means for moving the jack to cause the shoe to be traversed by the tool, said jack comprising a base, shoe-holding means suspended from the base for rocking movement with respect thereto and connecting means between the base and the shoe-holding means to determine the path of the rocking movement, and means acting directly upon the shoe-holding means to rock it and thereby to rock the shoe.

26. A machine for operating upon the lower portion of a lasted shoe having, in combination, a tool, a jack, means for moving the jack to cause the shoe to be traversed by the tool, said jack comprising a base, shoe-holding means suspended from the base for rocking movement with respect thereto and a link pivoted to the base and to the shoe-holding means to determine the path of the rocking movement, and means acting directly upon the shoe-holding means to rock it and thereby to rock the shoe.

27. A machine for operating upon the lower portion of a lasted shoe having, in combination, an operating tool, a jack, and means for producing relative movement between the jack and the tool to cause the lower portion of the shoe to be traversed by the tool, said jack comprising a base, shoe-holding means pivotally suspended from said base, and means independent of the shoe for rocking the shoe-holding means about its pivotal suspension at predetermined times during the relative movement.

28. A machine for operating upon the lower portion of a lasted shoe having, in combination, an operating tool, a jack, and means for moving the jack to cause the lower portion of the shoe to be traversed by the tool, said jack comprising a base, shoe-holding means pivotally suspended from said base, and means independent of the shoe for rocking the shoe-holding means about its pivotal suspension at predetermined times during the movement of the jack.

29. A machine for operating upon the lower portion of a lasted shoe having, in combination, an operating tool, a jack, and means for producing relative movement between the jack and the tool to cause the lower portion of the shoe to be traversed by the tool, said jack comprising a base, shoe-holding means pivotally suspended from the base and including members for engaging the upper part only of the shoe in such manner as to hold the shoe right-side-up and to leave a free space about the lower portion of the shoe, and means independent of the shoe for rocking the shoe-holding means about its pivotal suspension at predetermined times during the relative movement.

30. A machine for operating upon the lower portion of a lasted shoe having, in combination, an operating tool, a jack, and means for moving the jack to cause the lower portion of the shoe to be traversed by the tool, said jack comprising a base, shoe-holding means pivotally suspended from the base and including members for engaging the upper part only of the shoe in such manner as to hold the shoe right-side-up and to leave a free space about the lower portion of the shoe, and means independent of the shoe for rocking the shoe-holding means about its pivotal suspension at predetermined times during the movement of the jack.

31. A machine for operating upon the lower portion of a lasted shoe having, in combination, an operating tool, a jack, and means for producing relative movement between the jack and the tool to cause the lower portion of the shoe to be traversed by the tool, said jack comprising a base, shoe holding means pivotally suspended from the base and including a movable member for clamping the shoe in place, means independent of the shoe for rocking the shoe-holding means about its pivotal suspension at predetermined times during the relative movement, and operator-controlled means operable in all positions of the shoe-holding means to move the clamping member in a direction to release the shoe.

32. A machine for operating upon the lower portion of a lasted shoe having, in combination, a tool, a jack, and means for moving the jack to cause the lower portion of the shoe to be traversed by the tool, said jack comprising a base, heel-end and toe-end guiding member on the base, one of said member being adjustable to provide for shoes of different lengths, and shoe-holding means suspended from the adjustable member for rocking movement with respect to the frame.

33. A machine for operating upon the lower portion of a lasted shoe having, in combination, a tool, a jack, and means for moving the jack to cause the lower portion of the shoe to be traversed by the tool, said jack comprising a base, heel-end and toe-end guiding members on the base, one of said members being adjustable to provide for shoes of different lengths, shoe-holding means suspended from the adjustable member for rocking movement with respect to the frame, and links connecting the base and the shoe-holding means to steady said last-named means in its rocking movement.

34. A machine for operating upon the lower portion of a lasted shoe having, in combination, a tool, a jack, and means for imparting movements of translation and rotation to the jack to cause the shoe to be traversed by the tool, said jack comprising a base, toe-end and heel-end guiding members one of which is adjustable to provide for shoes of different lengths, a shoe-holding mechanism, a pivotal axis about which said mechanism may be rocked, said pivotal axis being adjustable lengthwise of the shoe-holding mechanism, and means for suspending the pivotal axis from the adjustable guiding member.

35. A machine for operating upon a shoe having, in combination, an operating tool, a jack, and means for producing relative movement between the jack and the tool to cause a portion of the shoe to be traversed by the tool, said jack including a base, a shoe-engaging member movable to clamp the shoe in place and to release it, a movable bar on which said member is mounted, a carrier for said bar, a second movable bar located above the first bar and mounted on the base, means for suspending the carrier from the base, and means for communicating movement of one bar to the other.

36. A machine for operating upon the foxing area of a shoe having, in combination, a foxing-applying tool, a jack, and means for producing relative movement between the jack and the tool to cause the foxing area to be traversed by the tool, said jack including shoe-holding means for engaging the upper portion only of the shoe in such manner as to leave a free space around the lower portion and bottom of the shoe, and means for engaging and moving the shoe-holding means during the relative movement between the jack and the tool to tilt said means, and with it the shoe.

37. A machine for operating upon the foxing area of a shoe having, in combination, a foxing-applying tool, a jack, and means for producing relative movement between the jack and the tool to cause the foxing area to be traversed by the tool, said jack including shoe-holding means for engaging the upper portion only of the shoe in such manner as to leave a free space around the lower portion and bottom of the shoe, and means for engaging and moving the shoe-holding means during the relative movement between the jack and the tool to tilt the shoe about an axis extending widthwise of the shoe.

38. A machine for operating upon the foxing area of a shoe having, in combination, a foxing-applying tool, a jack, and means for producing relative movement between the jack and the tool to cause the foxing area to be traversed by the tool, said jack including shoe-holding means for engaging the upper portion only of the shoe in such manner as to leave a free space around the lower portion and bottom of the shoe, and means for engaging and moving the shoe-holding means during the relative movement between the jack and the tool to tilt the shoe about an axis extending widthwise of the shoe and to hold it tilted during the traverse of a portion of the shoe by the tool.

39. A machine for operating upon the foxing area of a shoe having, in combination, a foxing-applying tool, a jack, and means for moving the jack to cause the foxing area to be traversed by the tool, said jack including shoe-holding means for engaging the upper portion only of the shoe in such manner as to leave a free space around the lower portion and bottom of the shoe, and means for engaging and moving the shoe-holding means during the movement of the jack to tilt the shoe.

40. A machine for operating upon the foxing area of a shoe having, in combination, a foxing-applying tool, a jack, and means for moving the jack to cause the foxing area to be traversed by the tool, said jack including shoe-holding means for engaging the upper portion only of the shoe in such manner as to leave a free space around the lower portion and bottom of the shoe, and means for engaging and moving the shoe-holding means during the movement of the jack to tilt the shoe about an axis extending heightwise of the shoe.

41. A machine for operating upon the foxing area of a lasted shoe having, in combinaton, a frame, a foxing-applying tool, a post extending downwardly from the frame, a jack mounted on the post for turning movement and for movement of translation to carry the foxing area of the shoe past the tool, said jack including means constructed and arranged to suspend the shoe by engagement with its upper portion, and means for producing relative movement between the tool and the shoe heightwise of the shoe to provide for the difference in level between the heel portion and the toe portion of the foxing area.

42. A machine for operating upon the lower portion of a lasted shoe having, in combination, an operating tool, a jack, and means for moving the jack in a predetermined path to cause the shoe to be traversed by the tool, said jack including shoe-holding means comprising an abutment for engaging the rear portion of the shoe, a last-pin, and means for causing the last-pin to press the shoe against the abutment whereby the rear portions of all shoes irrespective of size pass successively through the same path during the movement of the jack.

43. A jack for holding a lasted shoe comprising an abutment for engaging the shoe, a last-pin adapted to enter the last-pin hole of the last, a member to which the last-pin is pivoted, and means for moving the member to cause the last-pin to cramp in the last-pin hole and to press the shoe against the abutment.

44. A jack for holding a lasted shoe comprising an abutment for engaging the rear portion of the shoe, a last-pin adapted to enter the last-pin hole of the last, a member to which the last-pin is pivoted, and means for moving the member to cause the last-pin to cramp in the last-pin hole and to press the rear portion of the shoe against the abutment.

45. A jack for holding a lasted shoe comprising a base, and shoe-holding means having members for engaging the upper portion only of the shoe in such manner as to hold the shoe right-side-up with an unobstructed space around the lower portion, said shoe-holding means being suspended from the base for rocking movement with respect thereto.

46. A jack for a lasted shoe comprising a base, toe-end and heel-end guiding members on the base, one of said members being adjustable to provide for shoes of different lengths, shoe-holding mechanism, a pivotal axis about which the shoe-holding mechanism may be rocked, said pivotal axis being adjustable lengthwise of the shoe-holding mechanism, and means for suspending the pivotal axis from the adjustable guiding member.

47. A machine for applying a foxing to a shoe having, in combination, a combined foxing-applying and foxing-indenting tool comprising a deformable roll and a rigid wheel mounted to rotate about a common axis, and means for causing the foxing area of a shoe to be traversed by said tool.

48. A machine for applying a foxing to a shoe having, in combination, a combined foxing-applying and foxing-indenting tool comprising a deformable roll and a rigid wheel mounted to rotate about a common axis, a member by which the tool is carried, said carrier-member being mounted for rotation about an axis which is substantially perpendicular to the axis of rotation of the tool, and means for causing the foxing area of the shoe to be traversed by the tool.

49. A machine for applying a foxing to a shoe having, in combination, a combined foxing-applying and foxing-indenting tool comprising a deformable roll and a rigid wheel mounted to rotate about a common axis, a member by which the tool is carried, a support on which the carrier-member is mounted for rotation about an axis substantially perpendicular to the axis of rotation of the tool, and yielding means tending to rotate the carrier-member about its axis.

50. A machine for applying a foxing to a shoe having, in combination, a combined foxing-applying and foxing-indenting tool comprising a deformable roll and a rigid wheel mounted to rotate about a common axis, a member by which the tool is carried, a support on which the carrier-member is mounted for rotation about an axis substantially perpendicular to the axis of rotation of the tool, yielding means tending to rotate the carrier-member about its axis, and means for causing the foxing area of the shoe to be traversed by said tool.

51. A machine for applying a foxing to a shoe having, in combination, a combined foxing-laying and foxing-indenting tool comprising a deformable roll and a rigid wheel mounted to rotate about a common axis, a member by which the tool is carried, a swinging arm on which the carrier-member is mounted for rotation about an axis substantially perpendicular to the axis of rotation of the tool, yielding means tending to rotate the carrier-member about its axis, and means for causing the foxing area of the shoe to be traversed by said tool.

52. A machine for applying a foxing to a shoe having, in combination, a combined foxing-laying and foxing-indenting tool comprising a deformable roll and a rigid wheel mounted to rotate about a common axis, a member by which the tool is carried, a swinging arm on which the carrier-member is mounted for rotation about an axis substantially perpendicular to the axis of rotation of the tool, yielding means tending to rotate the carrier-member about its axis, a jack for the shoe, and means for imparting movements of translation and rotation to the jack to cause the foxing area of the shoe to be traversed by the tool.

53. A foxing-applying machine having, in combination, a foxing-applying tool past which a shoe may be fed to cause the tool to lay a foxing on a shoe, means for guiding to the tool a strip of foxing which is longer than is needed for the shoe, means for severing the foxing strip, and means for thereafter feeding the forward end of the strip into position to be applied to the next shoe presented to the machine.

54. A foxing-applying machine having, in combination, a foxing-applying tool past which a shoe may be fed to cause the tool to lay a foxing on a shoe, means for guiding to the tool a strip of foxing which is longer than is needed for the shoe, means for severing the foxing strip, and means operated by the movement of the severing means for feeding the forward end of the strip into position to be applied to the next shoe presented to the machine.

55. A foxing-applying machine having, in combination, a foxing-applying tool past which a shoe may be fed to cause the tool to lay a foxing on a shoe, means for guiding to the tool a strip of foxing which is longer than is needed for the shoe, and means for severing the foxing strip at a locality which rests upon the foxing-applying tool.

56. A foxing-applying machine having, in combination, a foxing-applying roll past which a shoe may be fed to cause the roll to lay a foxing on a shoe, means for guiding to the roll a strip of foxing which is longer than is needed for the shoe, means for severing the foxing strip, and means for feeding the strip and for rotating the roll to advance the end of the strip into position to be applied to the next shoe presented to the machine.

57. A foxing-applying machine having, in combination, a foxing-applying roll past which a shoe may be fed to cause the roll to lay a foxing on a shoe, means for guiding to the roll a strip of foxing which is longer than is needed for the shoe, means for severing the foxing strip, and means for gripping the end of the strip against the roll and for rotating the roll sufficiently to advance the end of the strip into position to be applied to the next shoe presented to the machine.

58. A foxing-applying machine having, in combination, a foxing-applying tool, a support for a shoe, means for producing relative movement between the support and the tool to cause the foxing area of the shoe to be traversed by the tool, means for guiding to the tool a strip of foxing which is longer than is needed for the shoe, means for severing the foxing strip, and means for thereafter feeding the forward end of the severed strip into position to be applied to the next shoe presented to the machine.

59. A foxing-applying machine having, in combination, a foxing-applying tool, a support for a shoe, means for producing relative movement between the support and the tool to cause the foxing area of the shoe to be traversed by the tool, means for guiding to the tool a strip of foxing which is longer than is needed for the shoe, means for severing the foxing strip, and means operated by the movement of the severing means for feeding the forward end of the severed strip into position to be applied to the next shoe presented to the machine.

60. A foxing-applying machine having, in combination, a foxing-applying tool, a support for a shoe, means for producing relative movement between the support and the tool to cause the foxing area of the shoe to be traversed by the tool, means for guiding to the tool a strip of foxing which is longer than is needed for the shoe, and means for severing the strip at a locality which rests upon the foxing-applying tool.

61. A foxing-applying machine having, in combination, a foxing-applying tool, a support for a shoe, means for producing relative movement between the support and the tool to cause the foxing area of the shoe to be traversed by the tool, means for guiding to the tool a strip of foxing which is longer than is needed for the shoe, means for severing the strip at a locality which rests upon the foxing-applying tool, and means for pressing the extreme forward end of the severed strip against the tool and feeding it into proper position to be applied to the next shoe which is presented to the machine.

62. A foxing-applying machine having, in combination, a foxing-applying roll, a support for a shoe, means for producing relative movement between the support and the roll to cause the foxing area of the shoe to be traversed by the roll, means for guiding to the roll a strip of foxing which is longer than is needed for the shoe, means for severing the foxing strip, and means for feeding the strip and for rotating the roll to advance the end of the strip into position to be applied to the next shoe presented to the machine.

63. A foxing-applying machine having, in combination, a foxing-applying roll, a support for a shoe, means for producing relative movement between the support and the roll to cause the foxing area of the shoe to be traversed by the roll, means for guiding to the roll a strip of foxing which is longer than is needed for the shoe, means for severing the foxing strip, and means operated by the movement of the severing means for feeding the strip and for rotating the roll to advance the end of the strip into position to be applied to the next shoe presented to the machine.

64. A foxing-applying machine having, in combination, a foxing-applying roll, a severing knife, means for causing the knife to sever the foxing at a locality in contact with the roll, a gripper, and means for swinging the gripper bodily about the axis of the roll to advance the end of the strip into position to be applied to the next shoe presented to the machine.

65. A foxing-applying machine having, in combination, a foxing-applying roll, foxing-severing mechanism, a gripper, and means for operating the gripper first to engage the foxing strip to hold it during the severing operation and then to advance the end of the strip into position to be applied to the next shoe presented to the machine.

66. A foxing-applying machine having, in combination, a foxing-applying roll, foxing-severing mechanism, a gripper, and means operating first to swing the gripper angularly to engage the foxing strip and then to move it bodily to advance the end of the strip into position to be applied to the next shoe presented to the machine.

67. A foxing-applying machine having, in combination, an applying roll, a support for a shoe, means for producing relative movement of approach between the roll and the shoe to apply the leading end of a foxing strip to the foxing area of the shoe and for thereafter producing relative movement in a direction to cause the foxing area to be traversed by the roll, means for holding the roll and the shoe in such relative angular positions during the movement of approach that the roll first presses only the upper edge of the leading end of the foxing strip against the upper edge of the foxing area, and means for thereafter causing relative angular movement between the roll and the shoe to cause the roll to press the body portion of the leading end of the foxing strip against the body portion of the foxing area.

68. A foxing-applying machine having, in combination, a combined foxing-laying and foxing-indenting tool comprising a deformable roll and a rigid wheel, a support for a shoe toward which the tool is movable, and means for holding the tool in such angular position during the approach that the portion of the tool which just reaches operative position with respect to the shoe is the indenting wheel.

69. A foxing-applying machine having, in combination, a combined foxing-laying and foxing-indenting tool comprising a deformable roll and a rigid wheel, a support for a shoe toward which the tool is movable, means for holding the tool in such angular position during the approach that the portion of the tool which just reaches operative position with respect to the shoe is the indenting wheel, and means for thereafter changing the angular position of the tool to render the roll effective.

70. A foxing-applying machine having, in combination, a combined foxing-laying and foxing-indenting tool comprising a deformable roll and a rigid wheel mounted for rotation about a common axis, a support for a shoe, means for causing relative movement of approach between the tool and the support to bring the tool into operative relation to the shoe preparatory to laying the foxing along the foxing area of the shoe, and means for holding the axis of the tool inclined in such manner that the first action of the tool is the pressing by the indenting wheel of the leading end of the upper edge of the foxing against the upper edge of the foxing area.

71. A foxing-applying machine having, in combination, a combined foxing-laying and foxing-indenting tool comprising a deformable roll and a rigid wheel mounted for rotation about a common axis, a support for a shoe, means for causing relative movement of approach between the tool and the support to bring the tool into operative relation to the shoe preparatory to laying the foxing along the foxing area of the shoe, means for holding the axis of the tool inclined in such manner that the first action of the tool is the pressing by the indenting wheel of the leading end of the upper edge of the foxing against the upper edge of the foxing area, and means for thereafter changing the inclination of the axis of the tool to press the body portion of the leading end of the foxing against the foxing area.

72. A foxing-applying machine having, in combination, a combined foxing-laying and foxing-indenting tool comprising a deformable roll and a rigid wheel mounted for rotation about a common axis, a support for a shoe, means for causing relative movement of approach between the tool and the support to bring the tool into operative relation to the shoe preparatory to laying the foxing along the foxing area of the shoe, means for holding the axis of the tool inclined in such manner that the first action of the tool is the pressing by the indenting wheel of the leading end of the upper edge of the foxing against the upper edge of the foxing area, and means for thereafter swinging the tool about the foxing-engaging locality of the indenting wheel to move the roll into operative position.

73. A foxing-applying machine having, in combination, a combined foxing-laying and foxing-indenting tool comprising a deformable roll and a rigid indenting wheel mounted to rotate about a common axis, a carrier for the tool mounted for rotary movement about an axis substantially perpendicular to the axis of rotation of the tool whereby the tool may be swung bodily into different angular positions, a support for the shoe, means for causing relative movement of approach between the shoe support and the tool carrier to bring the tool into operative relation to the shoe preparatory to the lying of the foxing along the foxing area of the shoe, means for holding the tool in such angular position during said approach that the indenting wheel reaches operative position first, and means for thereafter changing the angular position of the tool to cause the roll to reach operative position.

74. A machine for applying a foxing to a shoe having, in combination, a supply reel for a strip of foxing, means for rotating the reel to unwind the foxing strip from it, a brake adapted to be applied to prevent rotation of the reel and to be released to free the reel for rotation, means for applying the leading end of the foxing strip to the shoe and at the same time feeding the leading end, and means controlled by the feeding movement for applying and releasing the brake.

75. A machine for applying a foxing to a shoe having, in combination, a supply reel for a strip of foxing, means for rotating the reel to unwind the foxing strip from it, a brake adapted to be applied to prevent rotation of the reel and to be released to free the reel for rotation, means for applying the leading end of the foxing strip to the shoe and at the same time feeding the leading end, there being a loop of foxing between the supply reel and the feeding means, and a member movable by the lengthening and shortening of the loop to apply and release the brake.

76. A machine for applying a foxing to a shoe having, in combination, a supply reel for a coiled foxing strip having intercoiled therewith a separator strip, a winding reel for the separator strip, means for rotating the winding reel and thereby through the separator strip rotating the supply reel in a direction to unwind the foxing strip, means for applying the leading end of the foxing strip to the shoe and for feeding the leading end, a brake for one of the reels, and means controlled by the feeding movement of the leading end of the foxing strip as it is being applied to the shoe for operating the brake.

77. A machine for applying a foxing to a shoe having, in combination, a supply reel for a coiled foxing strip having intercoiled therewith a separator strip, a winding reel for the separator strip, means for rotating the winding reel and thereby through the separator strip rotating the supply reel in a direction to unwind the foxing strip, means for applying the leading end of the foxing strip to the shoe and for feeding the leading end, a brake for one of the reels, and means controlled by the amount of slack in the foxing strip between the foxing-applying means and the supply reel for operating the brake.

78. A machine for operating upon the lower portion of a lasted shoe having, in combination, a tool, a jack, means for imparting movement of rotation and translation to the jack to cause the shoe to be traversed by the tool, said jack comprising a base and shoe-holding means suspended from the base for rocking movement with respect thereto, and means acting directly upon the shoe-holding means to rock it and thereby to rock the shoe.

ERNEST W. STACEY.

CERTIFICATE OF CORRECTION.

Patent No. 2,041,379.

May 19, 1936.

ERNEST W. STACEY.

It is hereby certified that error appears in the printed specification of the above numbered patent requiring correction as follows: Page 1, first column, line 21, for "firmly" read flimsy; page 19, second column, line 21, claim 73, for "lying" read laying; and that the said Letters Patent should be read with these corrections therein that the same may conform to the record of the case in the Patent Office.

Signed and sealed this 20th day of October, A. D. 1936.

(Seal)

Leslie Frazer
Acting Commissioner of Patents.